(12) United States Patent
Baarman et al.

(10) Patent No.: US 11,576,509 B2
(45) Date of Patent: Feb. 14, 2023

(54) INDUCTION-HEATED VESSEL

(71) Applicant: HOLLYMATIC CORPORATION, Countryside, IL (US)

(72) Inventors: David W. Baarman, Fennville, MI (US); Gregory L. Clark, Ada, MI (US); Benjamin C. Moes, Wyoming, MI (US)

(73) Assignee: HOLLYMATIC CORPORATION, Countryside, IL (US)

( * ) Notice: Subject to any disclaimer, the term of this patent is extended or adjusted under 35 U.S.C. 154(b) by 126 days.

(21) Appl. No.: 16/710,335

(22) Filed: Dec. 11, 2019

(65) Prior Publication Data

US 2020/0187689 A1 Jun. 18, 2020

Related U.S. Application Data

(60) Provisional application No. 62/780,443, filed on Dec. 17, 2018.

(51) Int. Cl.
*A47G 19/22* (2006.01)
*A47J 41/00* (2006.01)
(Continued)

(52) U.S. Cl.
CPC ..... *A47G 19/2227* (2013.01); *A47G 19/2288* (2013.01); *A47J 41/00* (2013.01);
(Continued)

(58) Field of Classification Search
CPC ............ A47G 19/2227; A47G 19/2288; A47G 2200/166; A47J 41/00; B65D 81/38;
(Continued)

(56) References Cited

U.S. PATENT DOCUMENTS 5,842,353 A * 12/1998 Kuo-Liang ............. F25B 21/04
                                                              219/419
7,104,413 B2 * 9/2006 Liu ..................... A47J 41/0055
                                                              215/12.1
(Continued)

FOREIGN PATENT DOCUMENTS

WO    2018/183574    10/2018
WO    2018/183583    10/2018

OTHER PUBLICATIONS

Jovani, M.A. et al., "Development of thermoglazes, glazes with electric and thermal conduction properties, for use as thermal ceramic tiles", 2002, pp. 133-146.
(Continued)

*Primary Examiner* — Don M Anderson
*Assistant Examiner* — Jennifer Castriotta
(74) *Attorney, Agent, or Firm* — Sughrue Mion, PLLC

(57) ABSTRACT

Induction-heated vessels, and processes for manufacturing induction-heated vessels and vessel components, are provided. The vessels can include a ceramic outer layer and a conductive heating element, which can be provided as a conductive glaze or coating, a conductive inner layer, or a label comprising a conductive element and an RFID tag, to allow the thermal transfer or conduction of heat from the heated surface directly to the contents of the vessel, while the ceramic outer layer of the vessel insulates the contents of the vessel. Also, systems and methods for heating and controlling induction-heated vessels and for tracking loyalty, use, and/or sales using RFID-enabled induction-heated vessels are provided.

4 Claims, 10 Drawing Sheets

(51) Int. Cl.
  *B65D 81/38* (2006.01)
  *A47J 41/02* (2006.01)
  *C09D 5/24* (2006.01)
  *H05B 6/10* (2006.01)
  *B05D 7/22* (2006.01)
  *H01Q 1/00* (2006.01)
  *C04B 41/45* (2006.01)
  *H01Q 1/22* (2006.01)

(52) U.S. Cl.
  CPC .............. *B05D 7/22* (2013.01); *B65D 81/38* (2013.01); *B65D 81/3865* (2013.01); *C04B 41/4537* (2013.01); *C09D 5/24* (2013.01); *H01Q 1/00* (2013.01); *H05B 6/10* (2013.01); *A47G 2200/166* (2013.01); *A47J 41/02* (2013.01); *H01Q 1/2225* (2013.01)

(58) Field of Classification Search
  CPC ............ B65D 81/3865; B65D 81/3874; H01Q 1/2225; G06K 7/10445
  See application file for complete search history.

(56) References Cited

U.S. PATENT DOCUMENTS

| | | | | |
|---|---|---|---|---|
| 7,843,345 | B2* | 11/2010 | Lazar | G06K 7/0008 340/572.1 |
| 8,561,830 | B2* | 10/2013 | Hallberg | B65D 1/265 220/592.2 |
| 9,355,398 | B2* | 5/2016 | Martinez de Velasco Cortina | G06Q 20/352 |
| 9,801,482 | B1* | 10/2017 | Alexander | A47G 19/2288 |
| 2005/0087255 | A1* | 4/2005 | Humphrey | G07F 7/025 141/94 |
| 2008/0087726 | A1* | 4/2008 | Norman | A47J 36/2438 235/385 |
| 2010/0000980 | A1 | 1/2010 | Popescu | |
| 2010/0187298 | A1* | 7/2010 | Phillips | G06Q 20/341 235/375 |
| 2011/0072978 | A1* | 3/2011 | Popescu | A47G 19/14 220/592.2 |
| 2011/0233219 | A1* | 9/2011 | Proskey | A47J 41/00 220/592.17 |
| 2015/0159822 | A1* | 6/2015 | Mohr | H03K 17/962 320/108 |

OTHER PUBLICATIONS

Enriquez, E., "Highly conductive coatings of carbon black/silica composites obtained by a sol-gel process", ScienceDirect, vol. 50, Issue 12, Oct. 2012, pp. 4409-4417.

Communication Relating to the Results of the Partial International Search for Application No. PCT/US2019/065597 dated Mar. 30, 2020, pp. 1-3.

International Search Report and the Written Opinion of the International Searching Authority for International Application PCT/US2019/065597 dated Jun. 23, 2020.

* cited by examiner

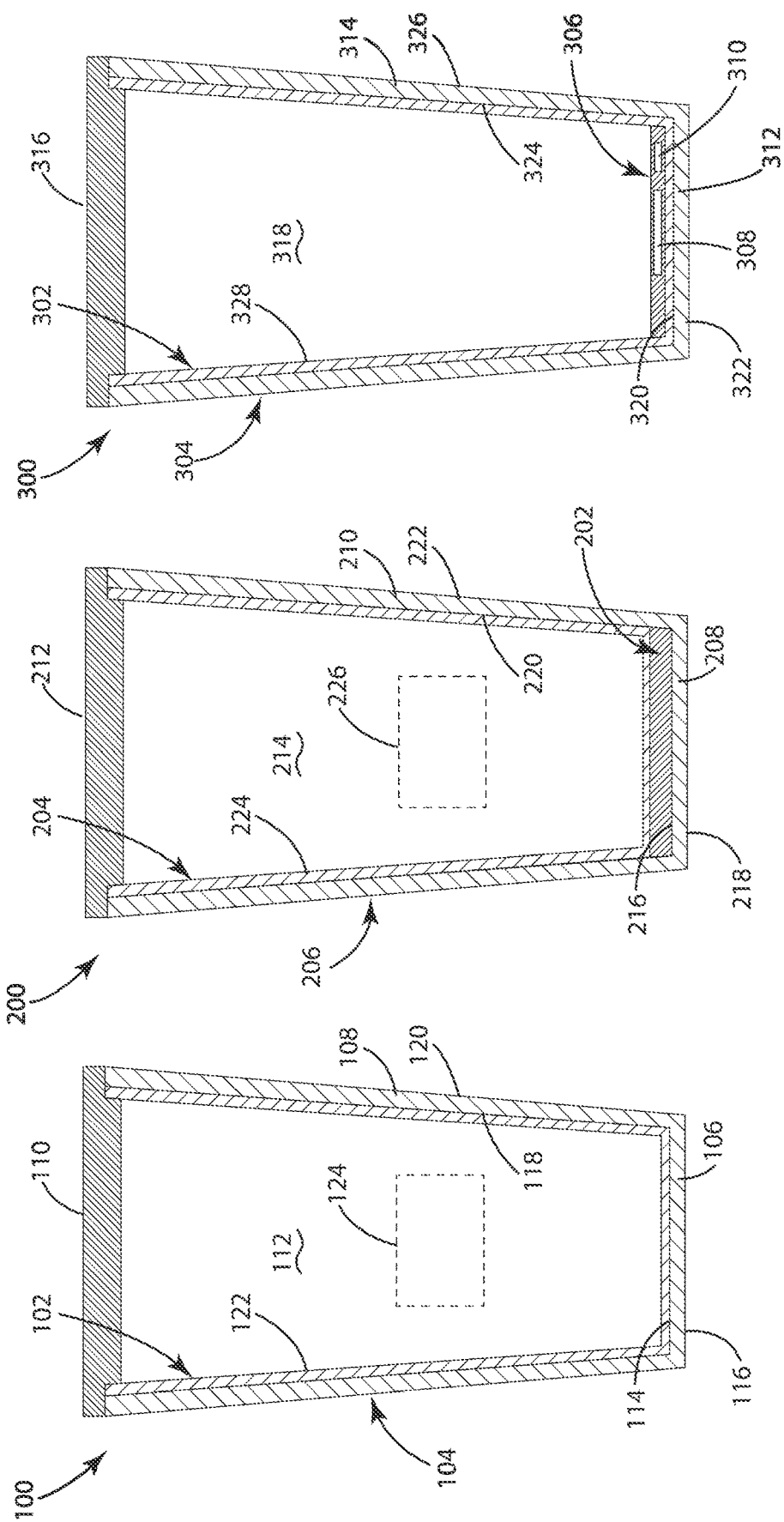

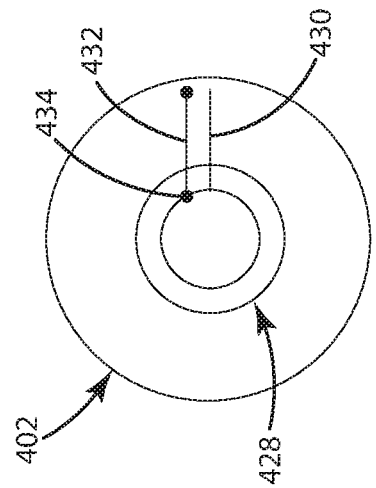
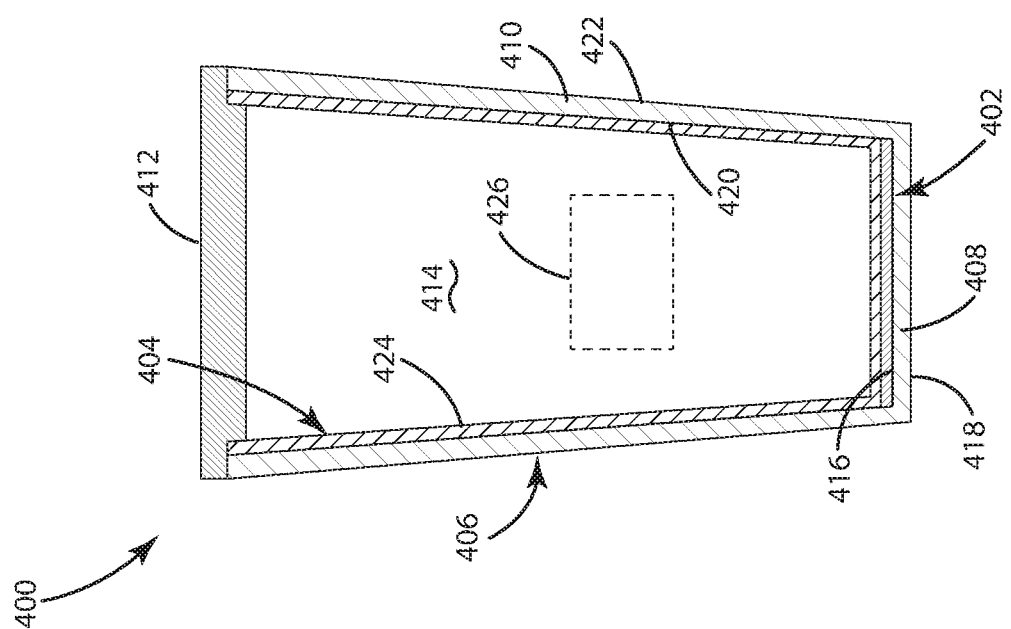

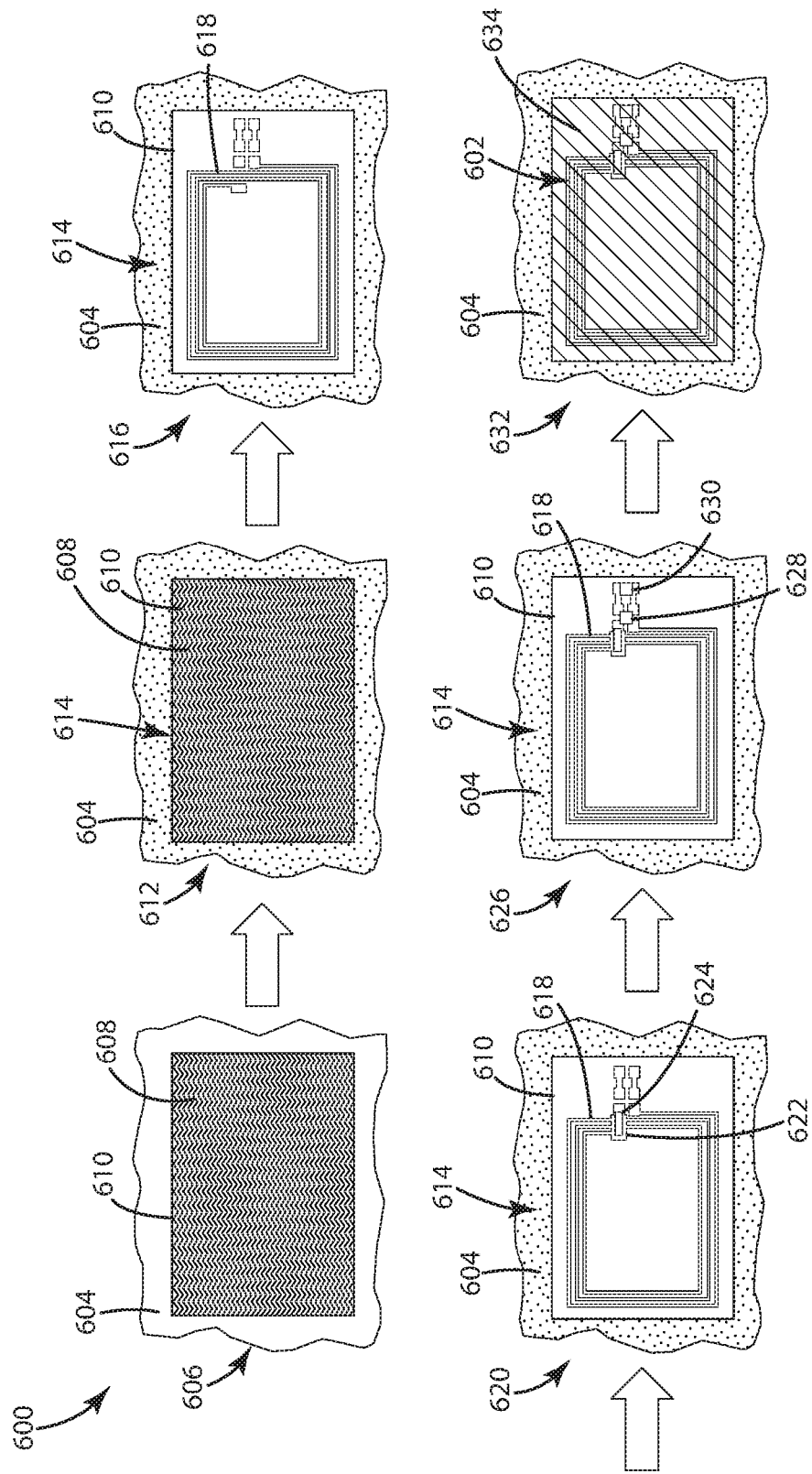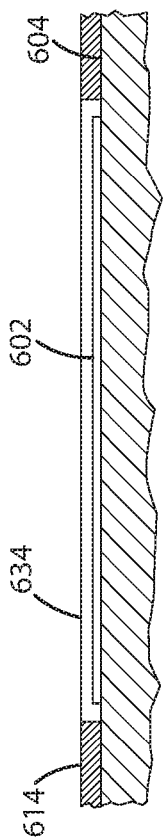

INDUCTION-HEATED VESSEL

BACKGROUND

The present invention relates to heated vessels, including vessels heated by induction heating.

Energy transfer and heating or cooking appliances, such as induction cooking appliances, are generally well known in the prior art. Such systems involve a heating element that transfers energy, typically by induction, to a receptor or cooking vessel which ultimately results in heating of package contents. Moreover, automated cooking systems and packaging systems that utilize energy transfer components, such as microwave popcorn packaging with an internal heating element, are generally known. However, known energy transfer appliances, systems, packaging systems and automated control systems utilized with such systems suffer from a number of drawbacks.

For example, in the past, induction-heated vessels have used a conductive label sealed to the bottom of a ceramic vessel. However, it has proved problematic to create a wear friendly, washable internally conductive material in a ceramic vessel for such labels. Other non-induction heated ceramic vessels wear well, but require more complex containers or a separate direct heating device in order to heat the vessel by radiation or thermal conduction. Such direct heating devices present opportunities to physically expose a user to heated surfaces. A simpler, more reliable solution is still needed.

Another shortcoming is that prior induction heating systems provide only very basic feedback and control. A solution that ensures improved feedback and control is needed if safe operation is to be adhered to, and if induction heating systems are to be integrated into wider use, such as in retail establishments.

BRIEF SUMMARY

Embodiments of the invention offer several key solutions to past problems with induction-heated vessels. In one aspect, the vessel can include a ceramic outer layer and a conductive heating element, which can be provided as a conductive glaze or coating, a conductive inner layer, or a label comprising a conductive element and an RFID tag, to allow the thermal transfer or conduction of heat from the heated surface directly to the contents of the vessel, while the ceramic outer layer of the vessel insulates the contents of the vessel.

In certain embodiments, the induction-heated vessel can be glazed or coated in the normal production process to have a conductive interior that is heated by an inductively coupled transmitter.

In certain embodiments, the induction-heated vessel is provided with a dual frequency tag with temperature monitoring capability that is also sealed in production to provide a trackable and controllable heated vessel. These and other objects, advantages, and features of the invention will be more fully understood and appreciated by reference to the description of the current embodiments and the drawings.

In one embodiment, a heated ceramic vessel includes a ceramic container body for insulating the contents of the vessel, a conductive heating element for thermal transfer or conduction of heat to the contents of the vessel, and an radio-frequency identification (RFID) tag for identification, sensor feedback, and tracking of the vessel. The conductive heating element can be conductive glaze or coating on an inner surface of the ceramic container body, a conductive inner layer on a base of the ceramic container body, or a label comprising a conductive element and the RFID tag.

In another embodiment, a dual frequency tag for an induction-heated vessel includes a smart tag comprising an ultra-high frequency (UHF) antenna and UHF interface to implement a supply chain protocol for long range application purposes and a high frequency (HF) antenna and high frequency interface to implement a proximity communication protocol to exchange data in a proximity range, at least one light-emitting diode (LED) integrated directly on the smart tag or implemented separately and electrically coupled to the smart tag, and a sensor system integrated directly on the smart tag or implemented separately and electrically coupled to the smart tag. The output and use of these sensors enable a functional profile to be constructed that enables accurate monitoring, accounting, reproduction and control of the energy being delivered.

In yet another embodiment, a system for tracking loyalty, use, and/or sales using RFID-enabled induction-heated vessels includes a plurality of dual frequency RFID tags, each associated with one induction-heated vessel and having a unique identifier, an RFID reader associated with a retail environment, and an induction heating device associated with the retail environment.

In still another embodiment, a method for manufacturing an induction-heated ceramic vessel is provided.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

The invention is described in detail below with reference to the accompanying figures, in which:

FIG. 1 is a sectional view of an induction-heated vessel according to a first embodiment of the invention;

FIG. 2 is a sectional view of an induction-heated vessel according to a second embodiment of the invention;

FIG. 3 is a sectional view of an induction-heated vessel according to a third embodiment of the invention;

FIG. 4 is a sectional view of an induction-heated vessel according to a fourth embodiment of the invention;

FIG. 5 is a schematic illustration of a heating element for the induction-heated vessel of FIG. 4;

FIG. 8 is a process flow diagram showing a process for forming an RFID tag on an induction-heated vessel according to another embodiment of the invention;

FIG. 9 is a schematic sectional view showing one embodiment of the RFID tag formed using the process of FIG. 8, wherein a sealant for the RFID tag is level with a glaze on the vessel;

DESCRIPTION OF THE CURRENT EMBODIMENT(S)

Figure 7:
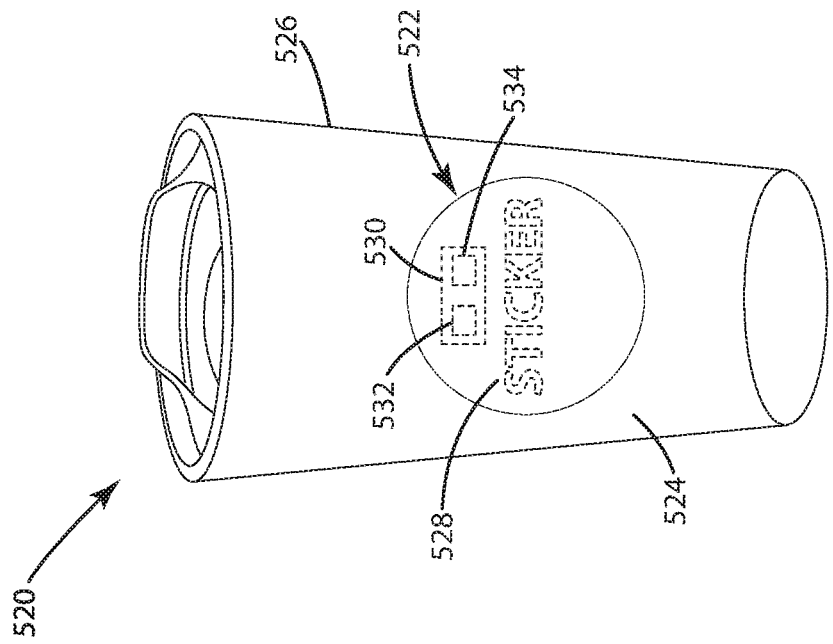
FIG. 7 is a schematic illustration of an induction-heated vessel having a dishwasher-safe RFID label according to yet another embodiment of the invention.

FIG. 1 is a sectional view of a heated vessel 100 according to a first embodiment of the invention. The vessel 100 includes a conductive glaze or coating 102 forming a heated surface of the vessel 100 to allow the thermal transfer or conduction of heat from the heated surface directly to the contents of the vessel 100, i.e., the heated media, while an outer layer 104 of the vessel 100 insulates the contents of the vessel 100.

The vessel 100 can be part of a system for heating and controlling the vessel 100 by induction, which can comprise an induction heating device or appliance (not shown) that heats the conductive coating 102 of the vessel 100 electrically by magnetic induction. The conductive coating 102 forms the inductively-heated surface of the system and heats the contents of the vessel 100, while the outer layer 104 of the vessel 100 forms a thermal insulator which reduces the transfer of heat to the exterior of the vessel 100. As such, the outer layer 104 of the vessel 100 can have a much lower thermal conductivity than the conductive coating 102, for example, 10-100 times lower.

The vessel 100 can have a container body having a container bottom wall or base 106, a container sidewall 108, and, optionally, a container top wall or top 110 opposite the base 106. An example container top 110 can be a removable lid, such as a press-fit or screw-on lid that can be removably coupled with the container sidewall 108 at an open upper end thereof. The container body defines a chamber 112 in which contents can be stored. In certain embodiments, the base 106 and sidewall 108 can define the outer layer 104 of the vessel 100.

The base 106 includes an inner surface 114 and an outer surface 116. The sidewall 108 includes an inner surface 118 and an outer surface 120. The conductive coating 102 can be applied to a portion of, or all of, the inner surfaces 114, 118 of the base 106 and/or sidewall 108. For example, the conductive coating 102 can be applied to >50%, >60%, >70%, >80%, >90%, or >99% of the base 106 and/or sidewall 108. In the illustrated embodiment, the conductive coating 102 is applied to all, or substantially all of, the inner surfaces 114, 118 of the base 106 and the sidewall 108 to define an innermost surface 122 of the vessel 100 which confronts the contents of the vessel and defines the chamber 112.

The vessel 100 comprises an radio-frequency identification (RFID) tag 124 for identification and tracking of the vessel 100. The RFID tag 124 can be a machine-readable element that can store and transmit a unique identifier, such as an electronic serial number (ESN), that may be pre-associated with a particular vessel 100. The RFID tag 124 can, for example, communicate with an induction heating element or appliance of a system for heating and controlling the vessel 100 by induction. The RFID tag 124 can be attached to, formed on, or otherwise coupled with the vessel 100 in a variety of locations and by a variety of methods, some examples of which are described below in greater detail. In one example, the RFID tag 124 can be attached to, formed on, or otherwise coupled with the sidewall 108, including on either the inner surface 118 or the outer surface 120 of the sidewall 108, or may be otherwise incorporated into the sidewall 108 of the vessel 100.

The vessel 100 can be at least partially ceramic. In one embodiment, at least the outer layer 104 of the vessel 100 can be ceramic. In the illustrated embodiment, at least the base 106 and sidewall 108 of the vessel 100 can be ceramic. Application of the conductive coating 102 on an inside or content-facing surface of the ceramic material forming a portion of the vessel 100 allows heat to be conducted directly to the contents of the vessel 100. Optionally, the lid or top 110 of the vessel 100 can be ceramic, or may alternately be metal or plastic. Some non-limiting examples of ceramic materials for the vessel 100 include, but are not limited to bone china, glass, earthenware, porcelain, or stoneware.

The conductive coating 102 can be any material with suitable electric/thermal conductivity properties for induction heating and which can fuse to the ceramic portion of the vessel 100 through firing. In one embodiment, the conductive coating 102 can have an electrical resistance of ≤10 ohms. In other embodiments, the conductive coating 102 can have a higher resistance.

In one embodiment, the conductive coating 102 can comprise silica as the main glass former and at least one conductive metal. Other components of the coating 102 can include various metal oxides, colorants, and/or opacifiers.

A glaze composition as described above (i.e., comprising silica and at least one conductive metal) can be applied to the ceramic outer layer 104 and fired in a kiln using a single-fire cycle to form the conductive coating 102. When fired, glass forms and bonds the metal material to form highly conductive pathways within the silica structure across the coating 102. The single-fire cycle can have a maximum temperature of ≤1400° C., ≤1300° C., ≤1200° C., or ≤1100° C. The firing temperature may be dependent on the ceramic material; for example a high fire stoneware can be fired at 1305° C. and a low fire stoneware can be fired at 1100° C.

A specific embodiment of a conductive glaze or coating materials for the vessel 100 is a ceramic glaze with a semiconductor system, such as tin or tin oxide doped with antimony. In one specific example, a pre-fused ceramic composition or frit containing antimony is combined with tin or tin oxide ($SnO_2$) to obtain a semiconductor glaze. Examples of such glazes are disclosed in "Development of Thermoglazes, Glazes with Electrical and Thermal Conduction Properties, for use as Thermal Ceramic Tiles" by M. A. Jovani et al., *Qualicer* 2002, pages 133-146, which is incorporated herein by reference in its entirety. Table 1 shows one example of a material composition for the frit. Table 2 shows one example of some industrial grade raw materials that can be used in the formulation of the material composition shown in Table 1.

TABLE 1

Example material composition for frit.

| Oxides | $SiO_2$ | $Al_2O_3$ | $B_2O_3$ | ZnO | CaO | MgO | $Na_2O$ | $K_2O$ | $Sb_2O_3$ |
|---|---|---|---|---|---|---|---|---|---|
| Wt % | 58 | 5 | 5 | 10 | 20 | 3 | 1 | 5 | 3 |

TABLE 2

Industrial grade raw materials that can be used in the formulation of material composition.

| Raw Material | Content in Oxides (wt %) |
|---|---|
| Boric acid, $H_3BO_3$ | 56% $B_2O_3$ |
| Borax, $Na_2B_4O_7 \cdot 10H_2O$ | 49.3% $B_2O_3$ and 21.9% $Na_2O$ |
| Quartz, $\alpha$-$SiO_2$ | 98-99% $SiO_2$ |
| Alumina, $\alpha$-$Al_2O_3$ | 99.3% $Al_2O_3$ |
| Sodium carbonate, $Na_2CO_3$ | 58% $Na_2O$ |
| Potassium nitrate, $KNO_3$ | 46.2% $K_2O$ |
| Zinc oxide, ZnO | 99.5% ZnO |
| Calcium carbonate, $CaCO_3$ | 55.8% CaO |
| Antimony oxide (III), $Sb_2O_3$ | 99% $Sb_2O_3$ |
| Kaolin, $2SiO_2 \cdot Al_2O_3 \cdot 2H_2O$ | 39% $Al_2O_3$ and 47% $SiO_2$ |

In one embodiment of a process for manufacturing the vessel 100 shown in FIG. 1, a glaze composition as described above (i.e., a ceramic glaze with a semiconductor system comprising tin or tin oxide doped with antimony) is applied to the ceramic outer layer 104, such as by spray coating at least an inner surface of the outer layer 104, and fired in a kiln using a single-fire cycle to form the conductive coating 102. In one example, the single-fire cycle has a maximum temperature of 1150° C. In another example, the single-fire cycle has a maximum temperature of 1200° C. When fired, glass forms and the antimony diffuses from the glass towards the glass-tin interface, and forms highly conductive pathways across the coating 102. The pathways of conducting area are contiguous or substantially-contiguous, across the coating 102, in order to efficiently shunt the electromagnetic field in the coating 102 to create the eddy currents needed to resistively heat the vessel 100.

Another specific embodiment of a conductive coating 102 for the vessel 100 is a silica coating that contains carbon black as a conductor, i.e., a silica-carbon black coating. Such a coating can be applied to a glazed or unglazed ceramic. Examples of such coatings are disclosed in "Highly conductive coatings of carbon black/silica composites obtained by a sol-gel process" by E. Enriquez et al., *Carbon*, Volume 50, Issue 12, October 2012, pages 4409-4417, which is incorporated herein by reference in its entirety.

In one embodiment of a process for manufacturing the vessel 100 shown in FIG. 1, the coating composition can be applied using a sol-gel process. A silica precursor, such as tetraethyl orthosilicate (TEOS) can be reacted with water to produce silica gel, and the gel can then be dried, optionally with heat, to form the coating 102. Table 3 shows one example of a formulation for a silica-carbon black conductive coating.

TABLE 3

Example formulation for silica-carbon black conductive coating.

| Reagent | Material | Name and Source |
|---|---|---|
| Silica precursor | tetraethyl orthosilica 99% | TEOS, Sigma-Aldrich |
| Solvent | ethyl alcohol 99.9% | Sigma-Aldrich |
| Surfactant | nonionic surfactant | Triton 1-100, Sigma-Aldrich |
| Catalyst | hydrochloric acid 37% | Sigma-Aldrich |
| Catalyst | distilled water | |
| Carbon black | lamp black | LA108 | 1333-86-4, Spectrum Chemical |

The sol can be prepared from the reagents given in Table 3 with the following proportion: 1 part tetraethyl orthosilicate (TEOS) to 8 parts ethyl alcohol (EtOH) to 5 parts nonionic surfactant to 0.01 parts hydrochloric acid (HCl) to 3 parts distilled water ($H_2O$) to 8.5 parts lamp black.

The TEOS is mixed with the nonionic surfactant and ethyl alcohol, and the mixture is put in a blender or other mixing apparatus. Separately, the catalysts are mixed. While the blender or mixing apparatus is mixing at fairly high speed, the catalyst mixture is slowly added to form a sol solution. Next, the lamp black is added and mixing is continued for about 3 minutes to disperse the lamp black throughout the sol solution. The prepared sol solution is sprayed onto to the ceramic layer 104, air dried, and thermally treated in a temperature range of 300-500° C., or 300-400° C., for one hour.

Another specific embodiment of a conductive coating 102 for the vessel 100 is a silica coating that contains ferrite as a conductor, i.e., a silica-ferrite coating. A coating composition comprising silica and ferrite can be applied to the ceramic outer layer 104 and thermally treated in a temperature range of 300-500° C., or 300-400° C.

With any of the conductive glazes or coatings 102 disclosed above, after firing, the RFID tag 124 can be adhered to the outside of the vessel 100, such as on the outer surface 120 of the sidewall 108, or elsewhere on the vessel 100 in a location where the conductive glaze or coating 102 does not block the RFID field to enable data encoded in the RFID tag 124 to be captured by an RFID reader. In another embodiment, an RFID antenna can be included on the vessel 100 prior to firing, can be located under the conductive glaze or coating 102, i.e., between the conductive glaze or coating 102 and the outer layer 104, allowing the RFID antenna field to reach an RFID reader below or next to the vessel 100.

FIG. 2 is a sectional view of a heated vessel 200 according to a second embodiment of the invention. The vessel 200 includes an inner conductive layer 202 forming a heated surface of the vessel 100 and a non-conductive glaze 204 over the conductive layer 202 to allow the thermal transfer or conduction heat from the heated surface indirectly to the contents of the vessel 200, i.e., the heated media, while an outer layer 206 of the vessel 200 insulates the contents of the vessel 200. In one embodiment, the conductive layer 202 can be a foil having a resistance of ≤10 ohms/cm².

The vessel 200 can be part of a system for heating and controlling the vessel 200 by induction, which can comprise an induction heating device or appliance (not shown) that heats the conductive layer 202 of the vessel 200 electrically by magnetic induction. The conductive layer 202 forms the inductively-heated surface of the system and heats the contents of the vessel 100, while the outer layer 206 of the vessel 200 forms a thermal insulator which reduces the transfer of heat to the exterior of the vessel 200. As such, the outer layer 206 of the vessel 200 can have a much lower thermal conductivity than the conductive layer 202, for example, 10-100 times lower.

The vessel 200 can have a container body having a container bottom wall or base 208, a container sidewall 210, and, optionally, a container top wall or top 212 opposite the base 208. An example container top 212 can be a removable lid, such as a press-fit or screw-on lid that can be removably coupled with the container sidewall 210 at an open upper end thereof. The container body defines a chamber 214 in which contents can be stored. In certain embodiments, the base 208 and sidewall 210 can define the outer layer 206 of the vessel 200.

The base 208 includes an inner surface 216 and an outer surface 218. The sidewall 210 includes an inner surface 220 and an outer surface 222. The conductive layer 202 can be provided at or near the base 208. For example, the conductive layer 202 can be provided on the inner surface 216 of the base 208. The conductive layer 202 can be applied to a portion of, or all of, the inner surface 216 of the base 208. For example, the conductive layer 202 can be applied to >50%, >60%, >70%, >80%, >90%, or >99% of the base 208. The conductive layer 202 can extend at least partially up the sidewall 210 depending on the thickness of the layer 202. In the illustrated embodiment, the conductive layer 202 is applied to all, or substantially all of, the inner surface 216 of the base 208 and extends partially up the sidewall 210.

The glaze 204 can be applied over the conductive layer 202, and to a portion of, or all of, the inner surface 220 of the sidewall 210. For example, the glaze 204 can be applied to >50%, >60%, >70%, >80%, >90%, or >99% of the conductive layer 202 and/or sidewall 108. In the illustrated embodiment, the glaze 204 is applied over all of the conductive layer 202 and to all, or substantially all of, the inner surface 220 of the sidewall 210 to define an innermost surface 224 of the vessel 200 which confronts the contents of the vessel and defines the chamber 214.

The vessel 200 comprises a RFID tag 226 for identification and tracking of the vessel 200. The RFID tag 226 can be a machine-readable element that can store and transmit a unique identifier, such as an electronic serial number (ESN), that may be pre-associated with a particular vessel 200. The RFID tag 226 can, for example, communicate with an induction heating device or appliance of a system for heating and controlling the vessel 200 by induction. The RFID tag 226 can be attached to, formed on, or otherwise coupled with the vessel 200 in a variety of locations and by a variety of methods, some examples of which are described below in greater detail. In one example, the RFID tag 226 can be attached to, formed on, or otherwise coupled with the sidewall 210, including on either the inner surface 220 or the outer surface 222 of the sidewall 210, or may be otherwise incorporated into the sidewall 210 of the vessel 200. For example, the RFID tag 226 can be provided as a label adhered to various locations on the vessel 200, such as on the outer surface 222 of the sidewall 210, on the innermost surface 224 which confronts the contents of the vessel 200, or under the glaze 204, i.e., between the glaze 204 and the outer layer 206.

The vessel 200 can be at least partially ceramic. In one embodiment, at least the outer layer 206 of the vessel 200 can be ceramic. In the illustrated embodiment, at least the base 208 and sidewall 210 of the vessel 200 can be ceramic. Optionally, the lid or top 212 of the vessel 200 can be ceramic, or may alternately be metal or plastic. Some non-limiting examples of ceramic materials for the vessel 200 include, but are not limited to bone china, glass, earthenware, porcelain, or stoneware.

The conductive layer 202 can be any material with suitable electric/thermal conductivity properties for induction heating and which can be glazed. Some non-limiting examples of conductive layer materials for the vessel 200 include, but are not limited to mixtures of copper and tin and/or tin oxides. Table 4 shows one example of a material composition for the conductive layer 202 for a least some embodiments of the vessel 200, including showing the various raw materials used to prepare the conductive layer 202.

TABLE 4

Example material composition for conductive layer.

| | Material | |
|---|---|---|
| | Copper (Cu) | Tin (Sn) |
| Wt % | 55.1% | 44.9% |

For a cylindrical vessel 200, the volume of the conductive layer 202 can be calculated using the radius of the outer layer 206 of the vessel 200, or the radius of the sidewall 206 at the base 208, and a predetermined desired thickness of the layer 202. The calculated volume of the conductive layer 202 can then be converted to weight of each material for the composition using a desired weight percent (wt %) of each material and the mass of each material.

The glaze 204 can be any material suitable for fusing to the ceramic portion of the vessel 200 through firing. Some non-limiting examples of non-conductive glaze or coating materials for the vessel 200 can comprise silica as the main glass former. Other components of the glaze 204 can include various metal oxides, colorants, and/or opacifiers.

FIG. 3 is a sectional view of a heated vessel 300 according to a third embodiment of the invention. The vessel 300 includes a non-conductive glaze 302 over an outer layer 304 of the vessel 300, and a label 306 comprising a conductive element 308 and an RFID tag 310 for identification and tracking of the vessel 300. The label 306 forms a heated surface of the vessel 300 over the glaze 302 to allow the thermal transfer or conduction of heat from the heated surface directly to the contents of the vessel 300, i.e., the heated media, the outer layer 304 of the vessel 300 insulates the contents of the vessel 300. The label 306 can be a sealed, dishwasher safe label, such that the vessel 300 can be washed in a dishwasher without damaging the label 306.

The vessel 300 can be part of a system for heating and controlling the vessel 300 by induction, which can comprise an induction heating device or appliance (not shown) that heats the conductive element 308 of the label 306 electrically by magnetic induction. The conductive element 308 forms the inductively-heated surface of the system and heats the contents of the vessel 300, while the outer layer 304 of the vessel 300 forms a thermal insulator which reduces the transfer of heat to the exterior of the vessel 300. As such, the outer layer 304 of the vessel 300 can have a much lower thermal conductivity than the conductive element 308, for example, 10-100 times lower.

The vessel 300 can have a container body having a container bottom wall or base 312, a container sidewall 314, and, optionally, a container top wall or top 316 opposite the base 312. An example container top 316 can be a removable lid, such as a press-fit or screw-on lid that can be removably coupled with the container sidewall 314 at an open upper end thereof. The container body defines a chamber 318 in which contents can be stored. In certain embodiments, the base 312 and sidewall 314 can define the outer layer 304 of the vessel 300.

The base 312 includes an inner surface 320 and an outer surface 322. The sidewall 314 includes an inner surface 324 and an outer surface 326. The glaze 302 can be applied to a portion of, or all of, the inner surfaces 320, 324 of the base 312 and/or sidewall 314. For example, the glaze 302 can be applied to >50%, >60%, >70%, >80%, >90%, or >99% of the base 312 and/or sidewall 314. In the illustrated embodiment, the glaze 302 is applied to all, or substantially all of, the inner surfaces 320, 324 of the base 312 and the sidewall 314 to define an innermost surface 328 of the vessel 300 which confronts the contents of the vessel 300 and defines the chamber 318.

The vessel 300 can be at least partially ceramic. In one embodiment, at least the outer layer 304 of the vessel 300 can be ceramic. In the illustrated embodiment, at least the base 312 and sidewall 314 of the vessel 300 can be ceramic. Application of the label 306 on an inside or content-facing surface of the ceramic material forming a portion of the vessel 300 allows heat to be conducted directly to the contents of the vessel 300, and enables virtually any ceramic vessel to be adapted for induction heating. Optionally, the lid or top 316 of the vessel 300 can be ceramic, or may alternately be metal or plastic. Some non-limiting examples of ceramic materials for the vessel 300 include, but are not limited to bone china, glass, earthenware, porcelain, or stoneware.

The glaze 302 can be any material suitable for fusing to the ceramic portion of the vessel 300 through firing. Some non-limiting examples of non-conductive glaze or coating materials for the vessel 300 can comprise silica as the main glass former. Other components of the glaze 302 can include various metal oxides, colorants, and/or opacifiers.

The label 306 can be applied to or otherwise coupled with the vessel 300 in a variety of locations and by a variety of methods, some examples of which are described below in greater detail. In one example, the label 306 can be applied the innermost surface 328 of the vessel 300 defined by the glaze 302 after formation of the glaze 302, i.e., after firing of the vessel 300. The label 306 can be applied at or near the base 312, over the glaze 302. The label 306 can cover a portion of, or all of, the base 312. For example, the label 306 can cover >50%, >60%, >70%, >80%, >90%, or >99% of the base 312. The label 306 can extend at least partially up the sidewall 314 depending on the thickness of the label 306. In the illustrated embodiment, the label 306 covers all, or substantially all of, the innermost surface 328 of the vessel 300 defined by the glaze 302 over the base 312, and extends partially up the sidewall 314.

The label 306 can be applied by adhering or bonding the label 306 to the outer layer 304 of the vessel 300, particularly on an inner surface of the outer layer 304 to allow for direct thermal transfer to the contents of the vessel 300.

The conductive element 308 can, for example, comprise a conductive metal foil printed, stamped, or adhered to a substrate of the label 306.

The RFID tag 310 can, for example, communicate with an induction heating device or appliance of a system for heating and controlling the vessel 300 by induction. The RFID tag 310 can be a machine-readable element that can store and transmit a unique identifier, such as an electronic serial number (ESN), that may be pre-associated with a particular vessel 300.

FIG. 4 is a sectional view of a heated vessel 400 according to a fourth embodiment of the invention. The vessel 400 includes a conductive heating element 402 forming a heated surface of the vessel 400 and a non-conductive glaze 404 over the heating element 402 to allow the thermal transfer or conduction heat from the heated surface indirectly to the contents of the vessel 400, i.e., the heated media, while an outer layer 406 of the vessel 400 insulates the contents of the vessel 400.

The vessel 400 can be part of a system for heating and controlling the vessel 400 by induction, which can comprise an induction heating device or appliance (not shown) that heats the heating element 402 of the vessel 400 electrically by magnetic induction. The heating element 402 forms the inductively-heated surface of the system and heats the contents of the vessel 400, while the outer layer 406 of the vessel 400 forms a thermal insulator which reduces the transfer of heat to the exterior of the vessel 400. As such, the outer layer 406 of the vessel 400 can have a much lower thermal conductivity than the heating element 402, for example, 10-100 times lower.

The vessel 400 can have a container body having a container bottom wall or base 408, a container sidewall 410, and, optionally, a container top wall or top 412 opposite the base 408. An example container top 412 can be a removable lid, such as a press-fit or screw-on lid that can be removably coupled with the container sidewall 410 at an open upper end thereof. The container body defines a chamber 414 in which contents can be stored. In certain embodiments, the base 408 and sidewall 410 can define the outer layer 406 of the vessel 400.

The base 408 includes an inner surface 416 and an outer surface 418. The sidewall 410 includes an inner surface 420 and an outer surface 422. The heating element 402 can be provided at or near the base 408. For example, the heating element 402 can be provided on the inner surface 416 of the base 408.

The glaze 404 can be applied over the heating element 402, and to a portion of, or all of, the inner surface 420 of the sidewall 410. For example, the glaze 404 can be applied to >50%, >60%, >70%, >80%, >90%, or >99% the sidewall 408. In the illustrated embodiment, the glaze 404 is applied over all of the heating element 402 and to all, or substantially all of, the inner surface 420 of the sidewall 410 to define an innermost surface 424 of the vessel 400 which confronts the contents of the vessel and defines the chamber 414.

The vessel 400 comprises a RFID tag 426 for identification and tracking of the vessel 400. The RFID tag 426 can be a machine-readable element that can store and transmit a unique identifier, such as an electronic serial number (ESN), that may be pre-associated with a particular vessel 400. The RFID tag 426 can, for example, communicate with an induction heating device or appliance of a system for heating and controlling the vessel 400 by induction. The RFID tag 426 can be attached to, formed on, or otherwise coupled with the vessel 400 in a variety of locations and by a variety of methods, some examples of which are described below in greater detail. In one example, the RFID tag 426 can be attached to, formed on, or otherwise coupled with the sidewall 410, including on either the inner surface 420 or the outer surface 422 of the sidewall 410, or may be otherwise incorporated into the sidewall 410 of the vessel 400. For example, the RFID tag 426 can be provided as a label adhered to various locations on the vessel 400, such as on the outer surface 422 of the sidewall 410, on the innermost surface 424 which confronts the contents of the vessel 400, or under the glaze 404, i.e., between the glaze 404 and the outer layer 406.

The vessel 400 can be at least partially ceramic. In one embodiment, at least the outer layer 406 of the vessel 400 can be ceramic. In the illustrated embodiment, at least the base 408 and sidewall 410 of the vessel 400 can be ceramic. Optionally, the lid or top 412 of the vessel 400 can be ceramic, or may alternately be metal or plastic. Some non-limiting examples of ceramic materials for the vessel 400 include, but are not limited to bone china, glass, earthenware, porcelain, or stoneware.

The glaze 404 can be any material suitable for fusing to the ceramic portion of the vessel 400 through firing. Some non-limiting examples of non-conductive glaze or coating materials for the vessel 400 can comprise silica as the main glass former. Other components of the glaze 404 can include various metal oxides, colorants, and/or opacifiers.

Referring to FIG. 5, the heating element 402 can comprise a heating coil 428 made from metal that includes two wire leads 430, 432 comprising dissimilar materials, i.e., dissimilar electrical conductors, that create a thermocouple. The wire material for the first wire lead 430 is also used to create the heating coil 428, and the second wire lead 432 is bonded or otherwise joined to the wire material, or coil 428, at a junction 434. The wire leads 430, 432 can be connected to a sensor (not shown) that determines the temperature of the junction by measuring the differential voltage of the wires. In one embodiment the wire material for the heating coil 428 and the first wire lead 430 can be nickel chromium (e.g., nichrome) or an alloy comprising nickel and chromium, and the wire material for the second wire lead 432 can be nickel aluminum or an alloy comprising nickel and aluminum.

The vessels 100, 200, 300, 400 can be a cup-shaped container as shown herein, including being shaped as a coffee cup or tumbler. Alternative embodiments of the vessels 100, 200, 300, 400 include a mug, a baby bottle, a sealed food package, such as a sealed package having a tamper-proof lid, a bowl, a pan, or other cooking vessels.

Figure 6:
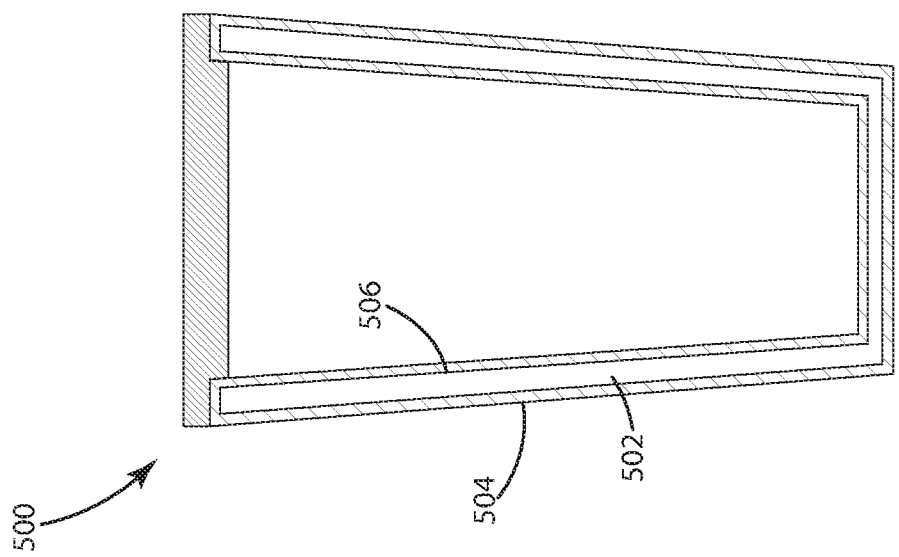
FIG. 6 is a sectional view of an induction-heated vessel having dual layer insulated wall according to another embodiment of the invention.

Optionally, any embodiment of the vessels 100, 200, 300, 400 can comprise a dual layer insulated vessel, a general example of which is shown in FIG. 6 and designated 500. The dual layer insulated vessel 500 defines an internal air or vacuum gap 502 in the container body having a container bottom wall or base and a container sidewall as described for the previous embodiments, and can include an outer sidewall layer 504 and an inner sidewall layer 506 which are separated by the gap 502. The gap 502 can be partially evacuated of air, creating a near-vacuum which significantly reduces heat transfer by conduction or convection. The dual layer insulated vessel 500 can provide improved protection of a user from the heat of the interior of the vessel 500, and can further insulate the heated interior from cooling or air convection. The inner and outer layers 504, 506 can be ceramic, including, but not limited to, bone china, glass, earthenware, porcelain, or stoneware.

Optionally, at least some embodiments of the vessels 100, 200, 400 comprise a dishwasher-safe RFID label 522 for the vessel, a general example of which is shown in FIG. 7 and designated 520. The label 522 can be provided on the vessel 520 in a variety of locations. In one example, the label 522 can be provided on the exterior of the vessel 520, and can more specifically be provided on an outer surface 524 of a sidewall 526 of the vessel 520. The label 522 can include text, a logo, a graphic, and/or other decoration 528 on the side of the label 522 visible to a user. The label 522 is designed to be permanently attached to the vessel 520 and wear like a typical sticker. The label 522 can be used for at least the first, second, and fourth embodiments of the vessels 100, 200, 400 described previously to provide the RFID tags 124, 226, 426 respectively.

The RFID label 522 can include an RFID tag 530. In one option, the RFID tag 530 can comprise a dual antenna RFID tag with a temperature sensor 532 for temperature feedback. The RFID tag 530 can include an LED 534. Using the sealed label 522 that is dishwasher safe on the exterior of the vessel 520 to contain the components of the RFID tag 530, including the temperature sensor 532 and LED 534, the entire interior of the vessel 520 can be glazed and/or the conductive system can be applied without having to give consideration to how the RFID tag will be applied to the interior of the vessel 520, and a more complex firing process and glaze decoration is possible.

The conductive system of the induction-heated vessel 520 can be provided on the interior of the vessel, including as a conductive glaze per the first embodiment of the vessel 100, a conductive layer per the second embodiment of the vessel 100, or as a conductive heating element per the fourth embodiment of the vessel 400. The conductive interior, combined with the exterior RFID label 522 on a ceramic container, make the vessel 520 very controllable, and allows for efficient heating and insulation as previously described.

FIG. 8 is a schematic illustration of a process for forming an RFID tag 602 on an induction-heated vessel according to another embodiment of the invention, and is generally designated 600. The RFID tag 602 can be formed on vessel in a variety of locations. In one example, the RFID tag 602 can be formed on an unglazed ceramic wall 604 of the vessel, which can more specifically be an inner surface of the ceramic wall which confronts or faces a chamber in which contents can be stored in the vessel.

The process 600 can begin with step 606, in which wax resist 608 is applied to an area 610 on the ceramic wall 604 where the RFID tag 602 is to be located. Next, in step 612, a glaze 614 is applied to at least the ceramic wall 604 of the vessel, and the vessel is fired in a kiln. The firing temperature can be, for example, ≤1400° C., ≤1300° C., ≤1200° C., or ≤1100° C. The firing temperature may be dependent on the ceramic material; for example a high fire stoneware can be fired at 1305° C. and a low fire stoneware can be fired at 1100° C. During this step, the wax resist 608 keeps the glaze 612 from adhering to the marked area 610. The glaze 614 applied at step 612 can be a conductive glaze or a non-conductive glaze, including any embodiment of conductive or non-conductive glaze described herein. The wax resist 608 is burned off during the firing process.

Following the glazing, at step 616, a circuit board 618 for the RFID tag is formed on the ceramic wall 604 of the vessel in the marked area 610, i.e., the unglazed area, and the vessel is fired a second time in the kiln to bond the circuit board 618 to the ceramic wall 604. Some non-limiting examples of metals for the circuit board 618 include, but are not limited to, copper, aluminum, tin, zinc, alloys thereof, and combinations thereof. The circuit board 618 can be formed using a printing or stamping technique. Printing the circuit board 618 can comprise applying or laminating a layer of metal on the ceramic wall 604 and chemically etching that layer to form circuit traces. Stamping the circuit board 618 can comprise laminating already-etched circuit traces on the ceramic wall 604.

The temperature for the second firing in step 616 can lower than the temperature for the first firing in step 612. The firing temperature for the second firing can be, for example, ≤1100° C., ≤800° C., ≤700° C., ≤500° C., or ≤300° C. The firing temperature may be dependent on the metal for the circuit board 618, and more particularly may be dependent on the melting point for the metal, as the firing temperature is maintained below the melting point. For example, a circuit board comprising copper can be fired at less than 1085° C., a circuit board comprising aluminum can be fired at less than 660.3° C., a circuit board comprising tin can be fired at less than 231.9° C., a circuit board comprising zinc can be fired at less than 419.5° C.

At step 620, additional circuit components can be attached or formed. For example, additional circuit components 622, 624, such as, but not limited to, insulators and jumpers, can be printed as thin films and soldered on the circuit board 618 or bonded to the circuit board 618 with an electrically conductive epoxy.

At step 626, an RFID chip 628 and a temperature sensor chip 630 are attached to the circuit board 618. The chips 628, 630 can be soldered on the circuit board 618 or bonded to the circuit board 618 with an electrically conductive epoxy.

Next, at step 632, the completed RFID tag 602 is sealed with a sealant 632, such as an epoxy. The sealant 632 can be selected in order to make the vessel dishwasher safe, such as by having a melting point greater than a maximum operating temperature, or maximum inlet water temperature, of a dishwasher, which can be, for example, ≤83° C., ≤72° C., or ≤66° C., depending on the dishwasher model. Optionally, the sealant 634 for the RFID tag 602 can be level with the glaze 614, an example of which is shown in of the FIG. 9. The sealant 634 can optionally be color matched to the glaze 614 to present a seamless interior surface on the vessel.

Optionally, the process 600 can be used for at least the first and second embodiments of the vessels 100, 200 described previously form the RFID tags 124, 226 respectively. With process 600, the RFID tag 124, 226 can forming on the vessel 100, 200 in a variety of locations. In one example, the RFID tag 124, 226 can be formed on the sidewall 108, 210, of the vessels 100, 200, and can more specifically be formed on the inner surface 118, 220 of the sidewall 108, 210.

Figure 10:
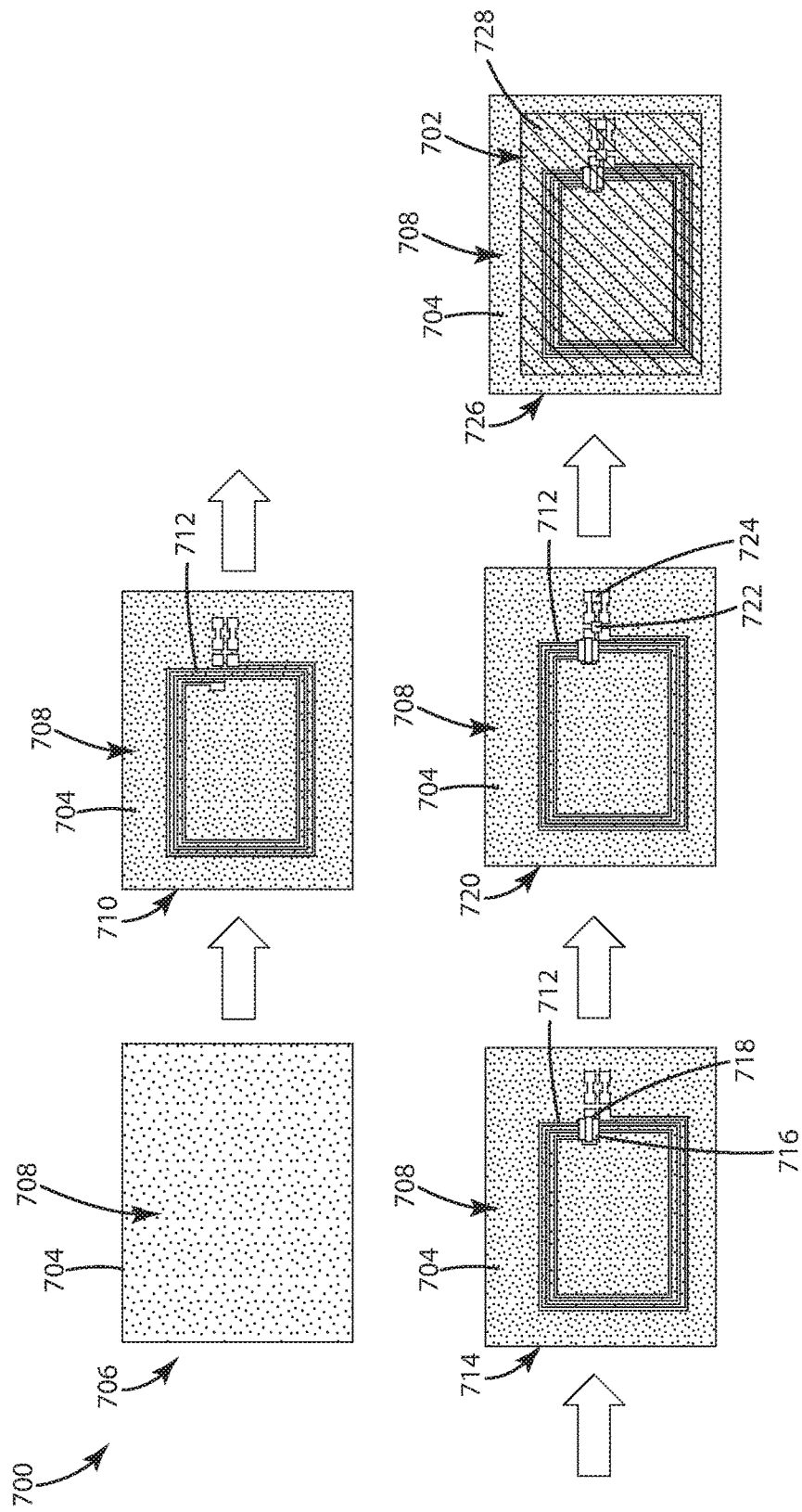
FIG. 10 is a process flow diagram showing a process for forming an RFID tag on an induction-heated vessel according to yet another embodiment of the invention.

FIG. 10 is a schematic illustration of a process for forming an RFID tag 702 on an induction-heated vessel according to another embodiment of the invention, and is generally designated 700. The RFID tag 702 can be formed on vessel in a variety of locations. In one example, the RFID tag 702 can be formed on a glazed ceramic wall 704 of the vessel, which can more specifically be an inner surface of the ceramic wall which confronts or faces a chamber in which contents can be stored in the vessel.

The process 700 can begin with step 706, in which a glaze 708 is applied to at least the ceramic wall 704 of the vessel, and the vessel is fired in a kiln. The firing temperature can be, for example, ≤1400° C., ≤1300° C., ≤1200° C., or ≤1100° C. The firing temperature may be dependent on the ceramic material; for example a high fire stoneware can be fired at 1305° C. and a low fire stoneware can be fired at 1100° C. The glaze 708 applied at step 706 can be a non-conductive glaze, including any embodiment of non-conductive glaze described herein.

Following the glazing, at step 710, a circuit board 712 for the RFID tag is formed on the glazed ceramic wall 704 of the vessel, and the vessel is fired a second time in the kiln to bond the circuit board 712 to the glaze 708. Some non-limiting examples of metals for the circuit board 712 include, but are not limited to copper, aluminum, tin, zinc, alloys thereof, and combinations thereof. The circuit board 712 can be formed using a printing or stamping technique. Printing the circuit board 712 can comprise applying or laminating a layer of metal on the ceramic wall 704 and chemically etching that layer to form circuit traces on the glaze 708. Stamping the circuit 712 board can comprise laminating already-etched circuit traces on the glaze 708.

The temperature for the second firing in step 710 can lower than the temperature for the first firing in step 706. The firing temperature for the second firing can be, for example, ≤1100° C., ≤800° C., ≤700° C., ≤500° C., or ≤300° C. The firing temperature may be dependent on the metal for the circuit board 712, and more particularly may be dependent on the melting point for the metal, as the firing temperature is maintained below the melting point. For example, a circuit board comprising copper can be fired at less than 1085° C., a circuit board comprising aluminum can be fired at less than 660.3° C., a circuit board comprising tin can be fired at less than 231.9° C., a circuit board comprising zinc can be fired at less than 419.5° C.

At step 714, additional circuit components 716, 718 can be attached or formed. For example, additional circuit components 716, 718, such as, but not limited to, insulators and jumpers, can be printed as thin films and soldered on the circuit board 712 or bonded to the circuit board 712 with an electrically conductive epoxy.

At step 720, an RFID chip 722 and a temperature sensor chip 724 are attached to the circuit board 712. The chips 722, 724 can be soldered on the circuit board 712 or bonded to the circuit board 712 with an electrically conductive epoxy.

Next, at step 726, the RFID tag 702 is sealed with a sealant 728, such as an epoxy. The sealant 728 can be selected in order to make the vessel dishwasher safe, such as by having a melting point greater than a maximum operating temperature, or maximum inlet water temperature, of a dishwasher, which can be, for example, ≤83° C., ≤72° C., or ≤66° C., depending on the dishwasher model.

Figure 11:
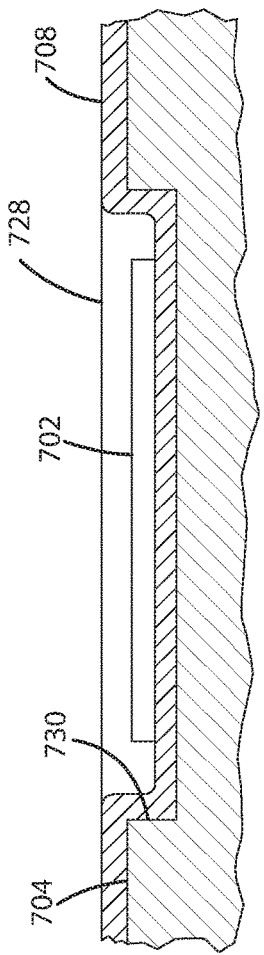
FIG. 11 is a schematic sectional view showing one embodiment of the RFID tag formed using the process of FIG. 10, wherein a sealant for the RFID tag is level with a glaze on the vessel.

Optionally, the RFID tag 702 provided within a recessed area 730 provided on the ceramic wall 704 of the vessel, an example of which is shown in of the FIG. 11. With the tag 702 applied after glazing, the provision of the recessed area 730 allows the sealant 728 for the RFID tag 702 to be level with the glaze 708 as shown in FIG. 11. The sealant 728 can optionally be color matched to the glaze 708 to present a seamless interior surface on the vessel.

Optionally, the process 700 can be used for at least the first and second embodiments of the vessels 100, 200 described previously form the RFID tags 124, 226 respectively. With process 600, the RFID tag 124, 226 can forming on the vessel 100, 200 in a variety of locations. In one example, the RFID tag 124, 226 can be formed on the sidewall 108, 210, of the vessels 100, 200, and can more specifically be formed on the inner surface 118, 220 of the sidewall 108, 210.

Figure 12:
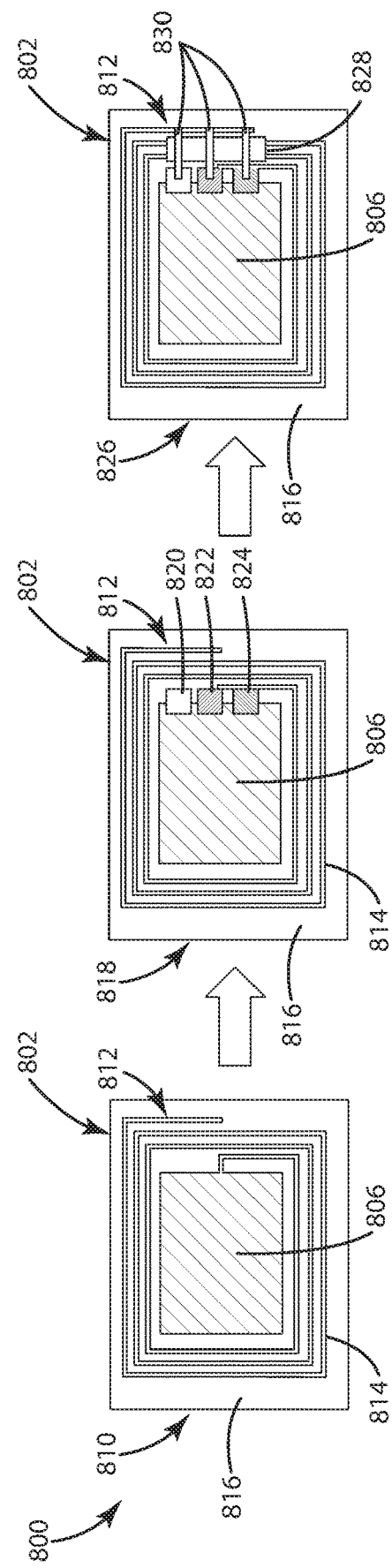
FIG. 12 is a process flow diagram showing a process for forming a label with an RFID tag that includes a conductive element for an induction-heated vessel according to another embodiment of the invention.

FIG. 12 is a schematic illustration of a process for forming a label 802 with an RFID tag 804 that includes a conductive element 806 on an induction-heated vessel according to another embodiment of the invention, and is generally designated 800. The label 802 can be formed on the vessel in a variety of locations. In one example, the label 802 can be formed on a glazed ceramic wall 808 of the vessel, which can more specifically be an inner surface of the ceramic wall which confronts or faces a chamber in which contents can be stored in the vessel. The process 800 can be used for at least the third embodiments of the vessel 300 described previously to provide the label 306. It is noted that the label 802 can be formed in situ on a vessel, or formed separately and then attached to a vessel after completion.

The process 800 can be begin with step 810, in which the conductive element 806 and a circuit board 812, including a coil 814, for the RFID tag 804 is formed on a backing material 816 for the label 802. Some non-limiting examples of backing materials 816 for the label 802 include, but are not limited to polyethylene, polyester, or other high temperature polymers. Some non-limiting examples of metals for the conductive element 806 and circuit board 812 include, but are not limited to, copper, aluminum, tin, zinc, alloys thereof, and combinations thereof.

The conductive element 806 and circuit board 812 can be formed using a printing or adhesion technique. Printing the conductive element 806 and circuit board 812 can comprise applying or laminating a layer of metal on the backing material 816 and chemically etching that layer to form circuit traces. Using an adhesion technique, the conductive element 806 and circuit board 812 can be cut from foil and adhered to the backing material 816.

At step 818, additional circuit components can be attached or formed. For example, an RFID chip 820 and passive components 822, 824, such as, but not limited to, a capacitor and a varistor, can be soldered on the circuit board 812 or bonded to the circuit board 812 with an electrically conductive epoxy. The conductive element 806 can be used as a bond pad for the RFID chip 820 and passive components 822, 824, as shown in the illustrated embodiment. In the illustrated embodiment, the varistor 824 is printed or bonded to the circuit in parallel with the coil 814 to provide overvoltage protection when large amounts of electromagnetic energy are applied to the conductive element 806. Optionally, a thermocouple can be created by printing or bonding a conductive trace of a dissimilar metal material on the conductive element 806, creating a voltage at the junction of the materials that varies with temperature.

Next, at step 826, additional circuit components can be attached or formed. For example, additional circuit components 828, 830, such as, but not limited to, an insulators and jumpers, can be printed as thin films and soldered on the circuit board 812 or bonded to the circuit board 812 with an electrically conductive epoxy. In one embodiment, the insulator 828 can be added to prevent windings from connecting in unintended areas, such as at the connection to the coil 814. Jumpers 830 can then be printed or bonded over the insulator 828 to electrically connect the RFID chip 820 and passive components 822, 824 with the coil 814. Optionally, a cover material (not shown) can be attached over the backing material 816 at step 826. Alternatively, instead of a cover material, the label 802 can be sealed with a sealant, such as an epoxy.

Figure 13:
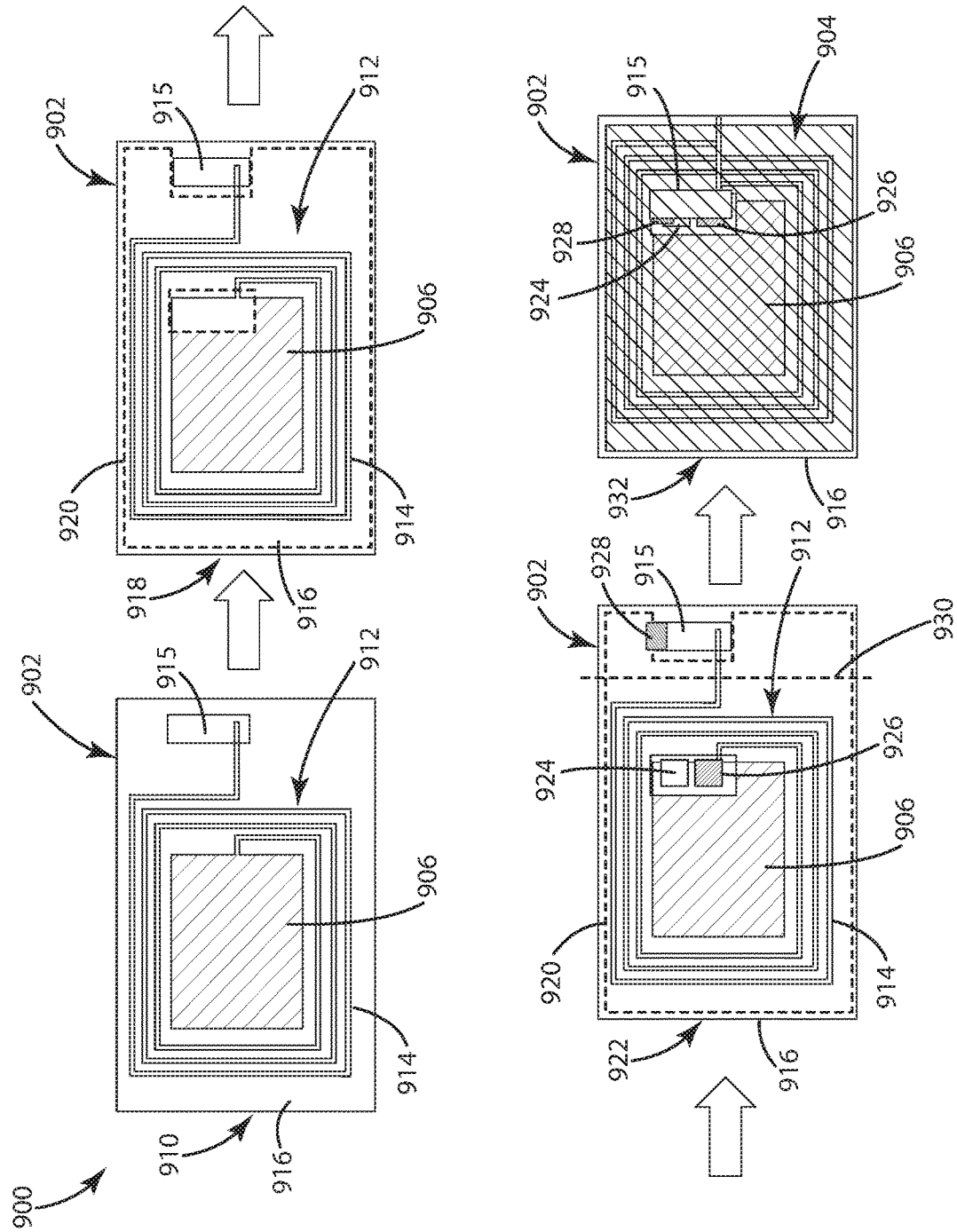
FIG. 13 is a process flow diagram showing a process for forming a label with an RFID tag that includes a conductive element for an induction-heated vessel according to yet another embodiment of the invention.

FIG. 13 is a schematic illustration of a process for forming a label 902 with an RFID tag 904 that includes a conductive element 906 on an induction-heated vessel according to another embodiment of the invention, and is generally designated 900. The label 902 has a folded edge design to connect the electrical circuitry of the RFID tag 904, as described in further detail below. The folded edge design can allows for fewer layers of conductive traces to be used in the tag 904. The label 902 can be formed on the vessel in a variety of locations. In one example, the label 902 can be formed on a glazed ceramic wall 908 of the vessel, which can more specifically be an inner surface of the ceramic wall which confronts or faces a chamber in which contents can be stored in the vessel. The process 900 can be used for at least the third embodiments of the vessel 300 described previously to provide the label 306. It is noted that the label 902 can be formed in situ on a vessel, or formed separately and then attached to a vessel after completion.

The process 900 can be begin with step 910, in which the conductive element 906 and a circuit board 912, including a coil 914 and a connecting pad 915, for the RFID tag 904 is formed on a backing material 916 for the label 902. Some non-limiting examples of backing materials 916 for the label 902 include, but are not limited to polyethylene, polyester, or other high temperature polymers. Some non-limiting examples of metals for the conductive element 906 and circuit board 912 include, but are not limited to, copper, aluminum, tin, zinc, alloys thereof, and combinations thereof.

The conductive element 906 and circuit board 912 can be formed using a printing or adhesion technique. Printing the conductive element 906 and circuit board 912 can comprise applying or laminating a layer of metal on the backing material 916 and chemically etching that layer to form circuit traces. Using an adhesion technique, the conductive element 906 and circuit board 912 can be cut from foil and adhered to the backing material 916.

At step 918, an insulating mask 920 is applied over a substantial portion of the conductive element 906 and circuit board 912. The insulating mask 920 is not applied over a portion of the conductive element 906 and at least a portion of the pad 915. The insulating mask 920 can be applied using a printing or adhesion technique, optionally including a thermal cure. Printing the insulating mask 920 can comprise applying or laminating a layer of polymer on the backing material 916. Using an adhesion technique, the insulating mask 920 can be cut and adhered to the backing material 916.

Next, additional circuit components can be attached or formed at step 922. For example, an RFID chip 924 and at least one passive component 926, such as, but not limited to, a capacitor, can be soldered on the circuit board 912 or bonded to the circuit board 912 with an electrically conductive epoxy. The conductive element 906 can be used as a bond pad for the RFID chip 924 and capacitor 926, as shown in the illustrated embodiment. A metal junction 928 can also be attached or formed on the pad 915 at step 922, and lies outside an imaginary fold line 930 of the backing material 916.

The RFID chip 924 can be located on or near the conductive element 906 and may measure the temperature near the chip 924, or the RFID chip 924 may be remotely located and use the conductive element 906 and a bonded trace of a dissimilar metal to determine the temperature at the junction of the materials. For the latter, a thermocouple can be created by printing or bonding a conductive trace of a dissimilar metal material on the conductive element 906, creating a voltage at the junction of the materials that varies with temperature.

In step 932, an edge of the backing material is folded over, along the fold line 930, and the RFID chip 924 is connected with the circuit via contact with connecting pad 915. Optionally, the metal junction 928 may be used to form a thermistor or thermocouple by joining dissimilar metals to the conductive element 906. Optionally, a cover material (not shown) can be attached over the backing material 916 at step 932. Alternatively, instead of a cover material, the label 902 can be sealed with a sealant, such as an epoxy.

Figure 14:
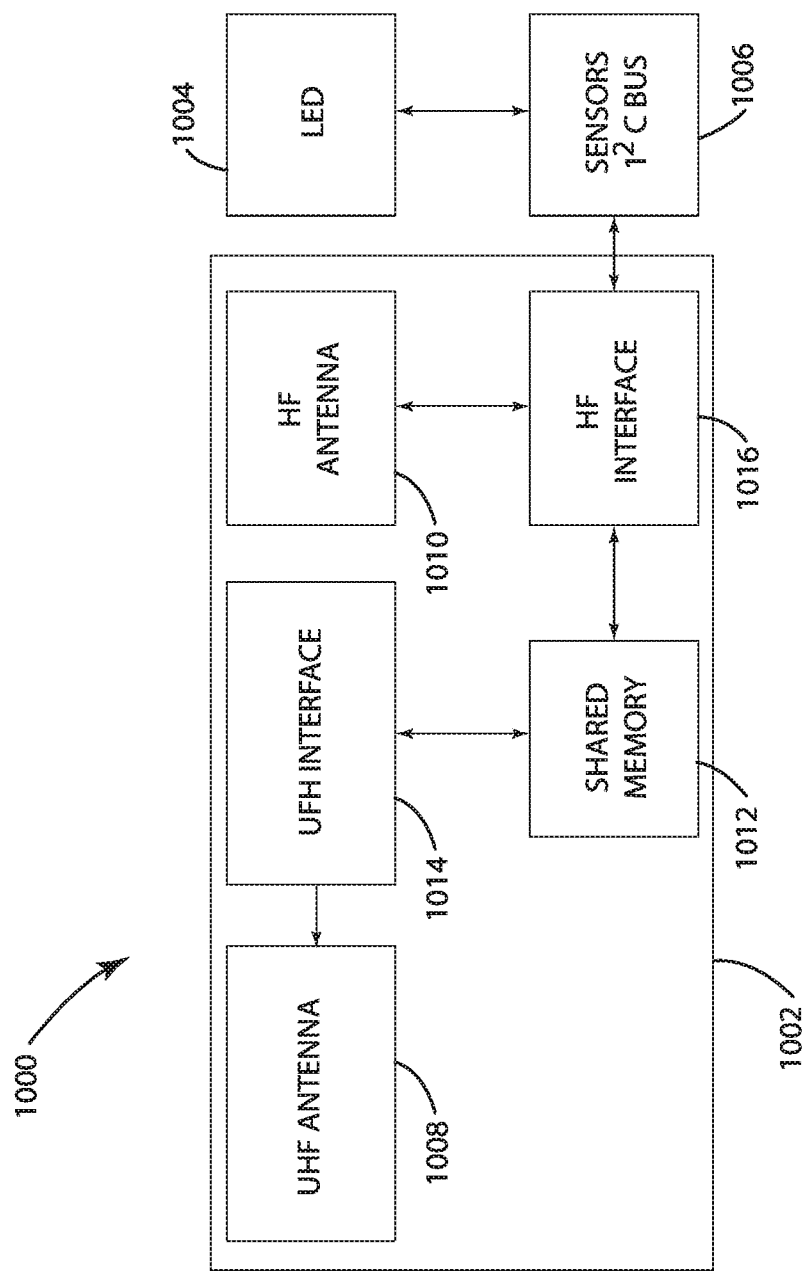
FIG. 14 is a schematic illustration of a dual frequency RFID tag for an induction-heated vessel, according to another embodiment of the invention.

FIG. 14 shows a block diagram of one embodiment of a dual frequency RFID tag, chip, or inlay 1000 for an induction-heated vessel, comprising a smart tag 1002, at least one light-emitting diode (LED) 1004, and a sensor system 1006. The LED 1004 and sensor system 1006 can be integrated directly on the smart tag 1002 or may be implemented separately and electrically coupled to the smart tag 1002. Optionally, any embodiment of induction-heated vessel or RFID tag disclosed herein can include a dual frequency RFID tag 1000 as described with respect to FIG. 14. The dual frequency RFID tag 1000 can be used for identification and tracking of the vessel, and can both control heating of the vessel and communicate with at least one remote or external device. The remote device can be an induction heating device or appliance of a system for heating and controlling the vessel by induction, or an RFID reader. The dual frequency RFID tag 1000 can be a machine-readable element that can store and transmit a unique identifier, such as an electronic serial number (ESN), that may be pre-associated with a particular vessel.

The RFID tag 1000 can include a high frequency (HF) chip and antenna that provides energy harvesting and an ultra-high frequency (UHF) chip and antenna that can be used for point of sale and longer range detection and identification. The UHF chip and antenna can be used for point of sale sales, inventory and customer identification, and in conjunction with loyalty programs. As depicted, the RFID tag 1000 may include a temperature sensor system 1006 to detect temperature information and at least one LED 1004.

The temperature sensor system 1006 can include one or more temperature sensors and I2C or other interface. For example, the temperature sensor system 1006 can be implemented by a RF430FRL154H device available from Texas Instruments. The RF430FRL154H device operates according to the NFC ISO15693 standard and uses a thermistor to measure temperature. Alternatively, as mentioned above, the temperature sensor system 1006 may be directly implemented on the smart tag 1002. Sensor measurements can be supported by an internal temperature sensor and onboard 14-bit sigma-delta analog-to-digital converter (ADC), and digital sensors can be connected through SPI or I$^2$C. The temperature sensor can operate in fully passive (battery-less) or single-cell battery-powered (semi-active) mode to achieve extended battery life in portable and wireless sensing applications.

The LED 1004 can provide a visual indicia or feedback to a user. For example, the LED 1004 can be an RGB LED and can be used to create colors for various user feedback and marketing opportunities. As an example, the LED 1004 can be powered to glow or pulse red when the vessel is heating the contents, and may remain steady, i.e., not pulse, when the contents are heated. In another example, the LED 1004 can flash while heating and/or when finished. The LED 1004 can create a marketing recognition opportunity for retail merchandising while on the shelf, as well as create a user feedback opportunity while heating.

The smart tag 1002 can be a flat configured transponder typically covered by a print-coded or other type of label, which includes various circuitry (e.g., antennas, memory, processors, and electrical connections). A smart tag can sometimes be referred to as an inlay. The labels, typically made of paper, fabric, or plastics, can be prepared as a paper roll with the inlays laminated between the rolled carrier and the label media. In some embodiments, the entire smart tag 1002 can be printed directly on a substrate, such as a vessel wall.

The smart tag 1002 can be a dual frequency smart tag that combines two or more different functionalities on a single die. For example, smart tag 1002 can be an off the shelf component, such as EM4423, available from EM Microelectronic. The smart tag 1002 can use an ultra-high frequency (UHF) antenna 1008 and UHF interface 1014 to implement an electronic product code (EPC) protocol (or another supply chain protocol) for long range application purposes and a high frequency (HF) antenna 1010 and high frequency interface 1016 to implement the near field communication (NFC) protocol (or another proximity communication protocol) to exchange data in a proximity range. In the current embodiment, both the protocols can share a common unique ID. The smart tag 1002 can have shared memory space, such as non-volatile memory 1012, which is accessible by both interfaces 1014, 1016. In addition, the HF and UHF interfaces 1014, 1016 can have their own individual memory. Various information can be stored in memory, including, for example, a unique ID associated with the RFID tag 1000 or with the vessel. In one embodiment, the unique ID is stored in shared memory 1012 and can be utilized by both the HF interface 1016 and the UHF interface 1014. Thermal limit information may be stored in memory 1012, for example the temperature thresholds of the vessel or one or more inductive power characteristic thresholds (e.g., voltage/current/frequency/duty cycle values) that correspond with one or more temperature thresholds.

The HF interface 1016 can include a processor, internal memory, and essentially any other circuitry for implementing a high frequency interface. For example, in some embodiments, the HF interface 1016 includes circuitry configured for compliance with ISO/IEC 14443A-3 and the NFC Forum Type 2 standard. The HF interface 1016 can enable product information, WiFi and Bluetooth pairings, smart posters and advertisings, and coupons/loyalty programs. In some embodiments the sensor system 1006 can include temperature sensing circuitry coupled to the thermocouple lead 432 for measuring vessel temperature. Information related to the vessel temperature can be communicated via the HF interface 1016 and HF antenna 1010 to an inductive power supply that can control the temperature of the vessel by adjusting the power supplied to the heating element of the vessel. For example, raw or processed temperature values or instructions based on temperature values can be communicated from the RFID tag 1000 to an inductive power supply or other external device.

The UHF interface 1014 can include a processor, internal memory, and essentially any other circuitry for implementing an ultra-high frequency interface. For example, in some embodiments, the UHF interface 1014 includes circuitry configured for compliance with ISO/IEC 18000-63 and the EPC Gen2 standard. The UHF interface 1014 can enable supply chain management, tracking and tracing the vessel, and identification of the vessel. As discussed above, in some embodiments the sensor system 1006 can include temperature sensing circuitry coupled to the thermocouple lead 432 for measuring vessel temperature. In some alternative embodiments, information related to the vessel temperature can be communicated via the UHF interface 1014 and UHF antenna 1008 to an external device. The UHF interface 1014 can be configured to use the energy harvested from the HF antenna 1010 and HF interface 1016 to power a UHF interface processor and provide enough power to create an accurate measurement for temperature feedback from the vessel.

The RFID tag 1000 can provide a dual frequency RFID system for product recognition, user recognition, thermal sensing, and/or thermal control of the vessel. The tag 1000 can be joined to the vessel such that the dual frequency functionality can enable EPC, NFC, and temperature control. In the current embodiment, as discussed above, the tag 1000 can enable both ultra-high frequency functionality and high frequency functionality in the RFID device joined to the vessel. In alternative constructions, additional or different RF antennas and RF interfaces may supplement or replace the described antennas and interface. In the current embodiment, the UHF antenna and interface can provide identification functionality at the point of sale and identification functionality to recognize the owner after purchase, for example using the EPC protocol in connection with the unique ID of the smart tag 1002. The HF antenna 1010 and associated interface 1016 can be used to harvest energy from the NFC field to power circuitry on or connected to the RFID tag 1000, such as the RF interfaces 1014, 1016, temperature sensor 1006, and LED 1004. As discussed above, the temperature sensor 1006 can detect vessel temperature information and provide feedback related to the temperature of the vessel to an external device, such as a inductive power supply that can control the vessel temperature. The sensor system 1006, for example in conjunction with the other RFID tag circuitry, can also provide temperature limit information to an external device, such as an inductive power supply, or account for the thermal limits in its instructions to the external device for temperature control. This information can be used to ensure that temperature control by the external device occurs based on feedback and that the temperature is maintained within the thermal limits of the vessel, for example the thermal limits and feedback information can be used to ensure an inductive power supply does not supply too much inductive energy such that the temperature of the vessel is heated beyond its upper thermal limit. In one example, the HF tag and energy harvesting can allow the LED 1004 to be controlled and powered by the HF field to indicate the temperature reached when on the heating device.

Figure 15:
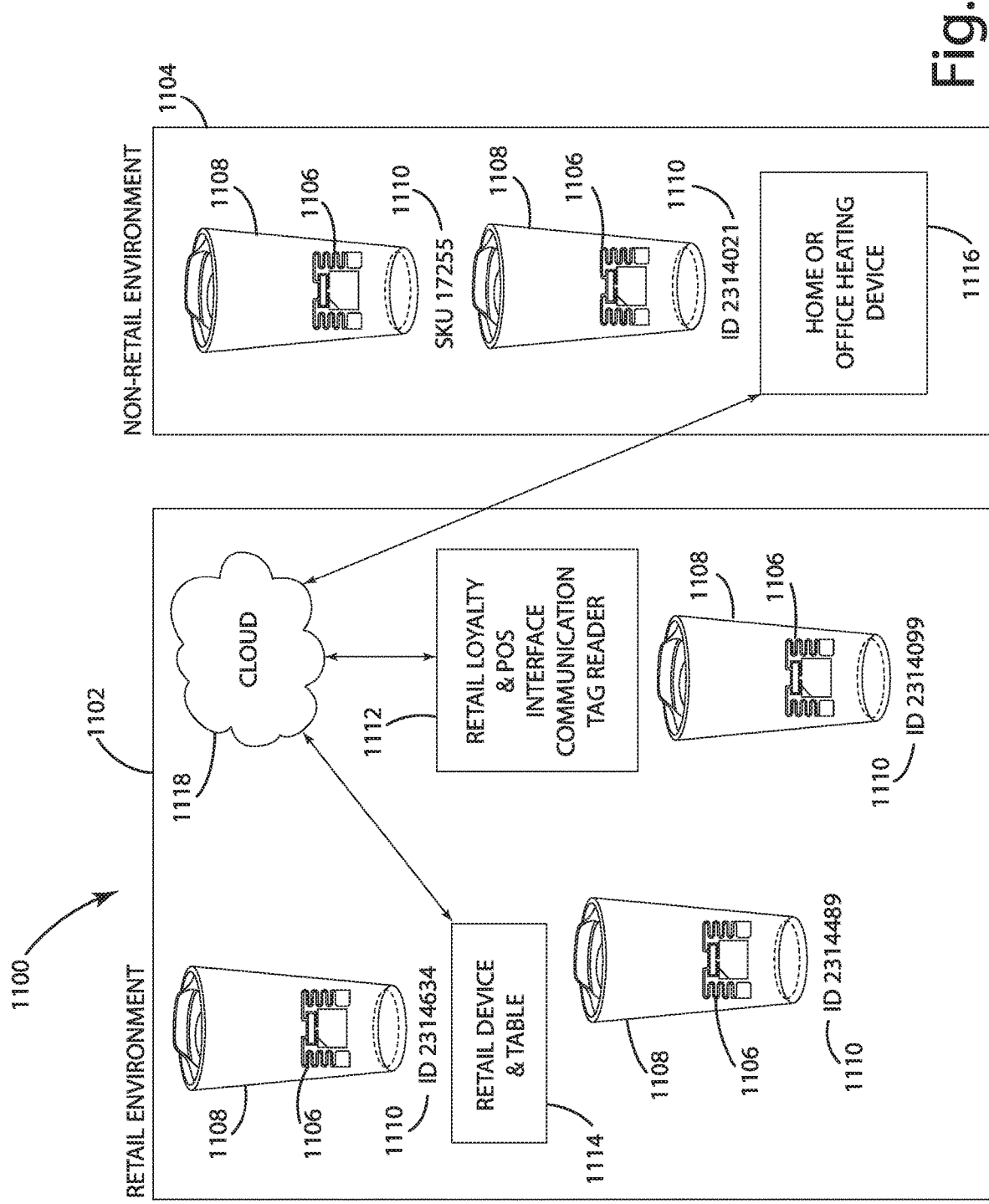
FIG. 15 is a schematic illustration of a system for tracking loyalty, use, and/or sales using RFID-enabled induction-heated vessels according to yet another embodiment of the invention.

FIG. 15 illustrates an embodiment of a system 1100 for tracking loyalty, use, and/or sales using RFID-enabled induction-heated vessels. Using the system 1100, products and customers can be inventoried for loyalty, product-usage, and purchase tracking opportunities using dual-frequency RFID tags on induction-heated vessels. The system 110 can monitor both a retail environment 1102, such as a store, coffee shop, or other retail location in which the vessels, or consumables for filling the vessels, are sold, and a non-retail environment 1104, such as a home or office place, in which the vessels or consumables are typically not sold.

The system 1110 includes a plurality of dual frequency RFID tags 1106, each associated with one induction-heated vessel 1108 and having a unique identifier 1110, such as an electronic serial number (ESN), an RFID reader 1112 associated with the retail environment 1102, an induction heating device 1114 associated with the retail environment 1102, and an induction heating device 1116 associated with the non-retail environment 1104. In operation, any of the vessels 1108 can be placed on any of the induction heating devices 1114, 1116, and the induction heating devices 1114, 1116 are configured to heat the heating element of the vessels 1108 electrically by magnetic induction.

The RFID reader 1112 can read information from the vessels 1108, and communicate with the induction heating device 1114 associated with the retail environment 1102 to provide appropriate control of the heating process to provide safe and efficient heating. The induction heating devices 1114, 1116 can also include integrated RFID readers. The RFID reader 1112 can include a retail loyalty & POS interface for the system 1100.

The induction heating devices 1114, 1116 can be a cooktop, stove, range, hob, or other appliance having an inducting heating or cooking surface, or an item of furniture incorporating an inducting heating or cooking surface. In one embodiment, the induction heating device 1114 associated with the retail environment 1102 can be integrated into a table or bar of the retail environment 1102.

The retail establishment 1102 can may utilize data sets associated with the unique identifiers 1110 and thus the vessels 1108 and/or their contents to control heating operations performed in-store, and to tracking customer loyalty and purchase history. The data sets may be retrieved from a remote database in a wide area network (i.e., cloud) 1118 based on the unique identifiers obtained by the reader 1112.

In one embodiment, a user in the retail environment 1102 can be verified by the RFID reader 112 via their vessel 1108 and its associated RFID tag 1106 and unique identifier 1110. The system 1100 logs when the vessel 1108 is purchased and a loyalty registration program can be presented to the user when the vessel 1108 is placed on the induction heating device 1114 associated with the retail environment 1102. The induction heating device 1114 can be provided with a user interface, such as a GUI or touchscreen, for presenting the loyalty registration program to the user. The loyalty registration program can assist the user in registering for a loyalty program of the retail establishment 1102, such as by registering a user name or other user identification that is thereafter associated with the unique identifier 1110 of their vessel. Optionally, instead of presenting the loyalty registration program on the induction heating device 1114, the loyalty registration program can be presented at a kiosk or other GUI or touchscreen physically located in the retail environment 1102. In yet another option, the user can download an application on their smartphone that includes the loyalty registration program. Thereafter, when the user enters the retail establishment 1102 with their vessel 1108, the RFID tag 1106 sends a UHF ID code to the system 1102 when polled. User statistics, processing speed and loyalty statistics are stored and measured over time.

In one embodiment, the dual frequency RFID tags 1106 can comprise the dual frequency RFID tag, chip, or inlay 1000 described above with reference to FIG. 14. Such a configuration allows the vessel 1108 and tag 1106 to be used for heating feedback, energy harvesting, and point of sale and longer range detection and identification. Per the description above, an LED provided on the tag 1106 can illuminate at the point of sale or when on the induction heating device 1114 to indicate that heating is in progress or completed.

Figure 16:
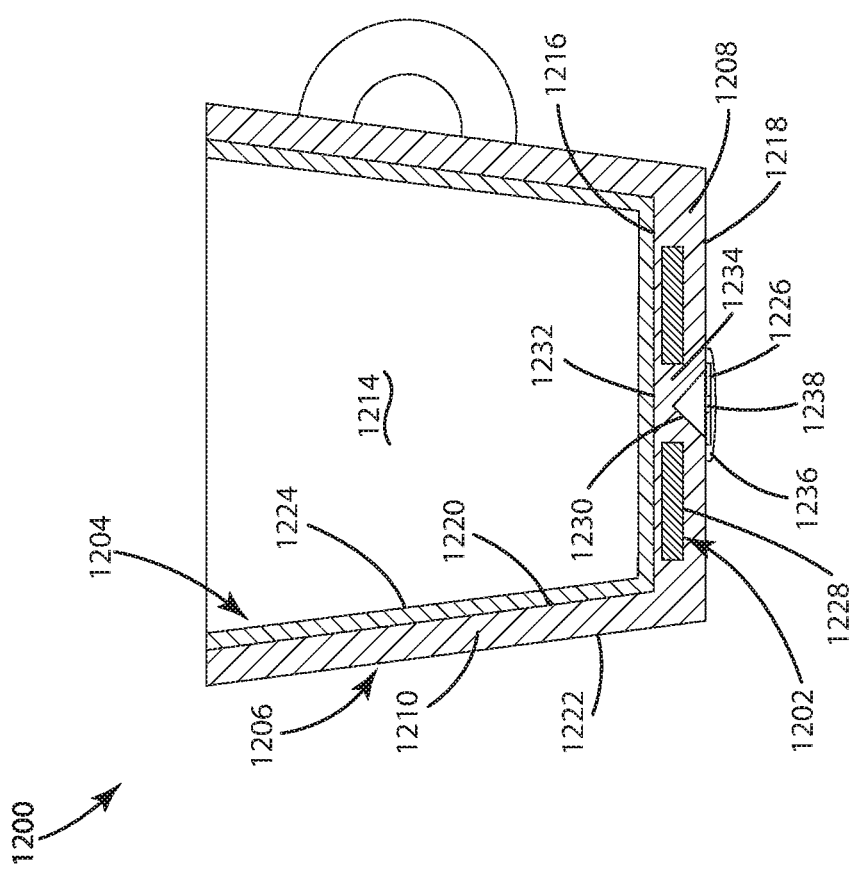
FIG. 16 is a sectional view of an induction-heated vessel according to yet another embodiment of the invention.

FIG. 16 is a sectional view of a heated vessel 1200 according to a fourth embodiment of the invention. The vessel 1200 includes a conductive heating element 1202 forming a heated surface of the vessel 1200 and a non-conductive glaze 1204 over the heating element 1202 to allow the thermal transfer or conduction heat from the heated surface indirectly to the contents of the vessel 1200, i.e., the heated media, while an outer layer 1206 of the vessel 1200 insulates the contents of the vessel 1200.

The vessel 1200 can be part of a system for heating and controlling the vessel 1200 by induction, which can comprise an induction heating device or appliance (not shown) that heats the heating element 1202 of the vessel 1200 electrically by magnetic induction. The heating element 1202 forms the inductively-heated surface of the system and heats the contents of the vessel 1200, while the outer layer

1206 of the vessel 1200 forms a thermal insulator which reduces the transfer of heat to the exterior of the vessel 1200. As such, the outer layer 1206 of the vessel 1200 can have a much lower thermal conductivity than the heating element 1202, for example, 10-100 times lower.

The vessel 1200 can have a container body having a container bottom wall or base 1208, a container sidewall 1210, and, optionally, a container top wall or top (not shown), such as a removable lid, opposite the base 1208. The container body defines a chamber 1214 in which contents can be stored. In certain embodiments, the base 1208 and sidewall 1210 can define the outer layer 1206 of the vessel 1200. The base 1208 includes an inner surface 1216 and an outer surface 1218. The sidewall 1210 includes an inner surface 1220 and an outer surface 1222. Optionally, the vessel 1200 can comprise a dual layer insulated vessel, a general example of which is shown in FIG. 6.

The vessel 1200 can be a cup-shaped container as shown herein, including being shaped as a mug. Alternative embodiments of the vessel 1200 include a coffee cup, a tumbler, a baby bottle, a sealed food package, such as a sealed package having a tamper-proof lid, a bowl, a pan, or other cooking vessels.

The vessel 1200 can be at least partially ceramic. In one embodiment, at least the outer layer 1206 of the vessel 1200 can be ceramic. In the illustrated embodiment, at least the base 1208 and sidewall 1210 of the vessel 1200 can be ceramic. Some non-limiting examples of ceramic materials for the vessel 1200 include, but are not limited to bone china, glass, earthenware, porcelain, or stoneware.

The glaze 1204 can be any material suitable for fusing to the ceramic portion of the vessel 1200 through firing. Some non-limiting examples of non-conductive glaze or coating materials for the vessel 1200 can comprise silica as the main glass former. Other components of the glaze 1204 can include various metal oxides, colorants, and/or opacifiers. The glaze 1204 can be applied to a portion of, or all of, the inner surfaces 1216, 1220 of the base 1208 and/or sidewall 1210. For example, the glaze 1204 can be applied to >50%, >60%, >70%, >80%, >90%, or >99% of the base 1208 and/or sidewall 1210. In the illustrated embodiment, the glaze 1204 is applied to all, or substantially all of, the inner surfaces 1216, 1220 of the base 1208 and the sidewall 1210 to define an innermost surface 1224 of the vessel 1200 which confronts the contents of the vessel 1200 and defines the chamber 1214.

The conductive heating element 1202 can comprise a heating coil 1228 embedded in the glaze 1204 or within the ceramic material of the outer layer 1206 itself, such as within the base 1208, between the inner and outer surfaces 1216, 1218. For a heating coil 1228 within the base 1208, as shown herein, the heating coil 1228 can be provided near the inner surface 1216 so that more heat is transferred to the chamber 1214 of the vessel 1200. For example, the heating coil 1228 can be provided closer to the inner surface 1216 than the outer surface 1218. In one example, the thickness of the ceramic material below the heating coil 1228, i.e., between the heating coil 1228 and the outer surface 1218, may be 2 to 50 times thicker than the thickness of the ceramic material above the heating coil 1228, i.e., between the heating coil 1228 and the inner surface 1216. In another example the thickness of the ceramic material above the heating coil 1228, i.e., between the heating coil 1228 and the inner surface 1216, is 0.5 mm thick and the thickness of the ceramic material below the heating coil 1228, i.e., between the heating coil 1228 and the outer surface 1218, may be 2 mm thick. The heating coil 1228 can be made from a material with a higher melt temperature than the firing temperature of the ceramic, such as nickel chromium (e.g., nichrome), carbon steel, or other conductive materials with high melt temperatures.

Optionally, the vessel 1200 can be formed with a void 1230 such that a small area exists in the base 1208 having a very thin layer 1232 of ceramic material. In one example, the thickness of the ceramic layer 1232 at the void 1230 may be $1/10^{th}$ of the thickness of the ceramic of the base 1208. The heating coil 1228 can be a disk, a coil of wire, a foil, or other heating element, with a space in the middle of the coil or element which is in register with the void 1230 to prevent direct heating near the area of the void 1230.

The vessel 1200 comprises a RFID tag 1226 for identification and tracking of the vessel 1200. The RFID tag 1226 can be a machine-readable element that can store and transmit a unique identifier, such as an electronic serial number (ESN), that may be pre-associated with a particular vessel 1200. The RFID tag 1226 can, for example, communicate with an induction heating device or appliance of a system for heating and controlling the vessel 1200 by induction. The RFID tag 1226 can be attached to, formed on, or otherwise coupled with the vessel 1200 in a variety of locations and by a variety of methods, some examples of which are described above in greater detail. In one example, the RFID tag 1226 can be provided as a label adhered to the outer layer 1204 of the vessel 1200.

In one embodiment, the RFID tag 1226 can be attached to, formed on, or otherwise coupled with the base 1208, on the outer surface 1218. The RFID tag 1226 can be sealed with a sealant 1236, such as an epoxy. Optionally, the RFID tag 1226 can be provided within a recessed area provided on the base 1208, which can allow the sealant 1236 to be level with the glaze outer surface of the base 1208.

Figure 17:
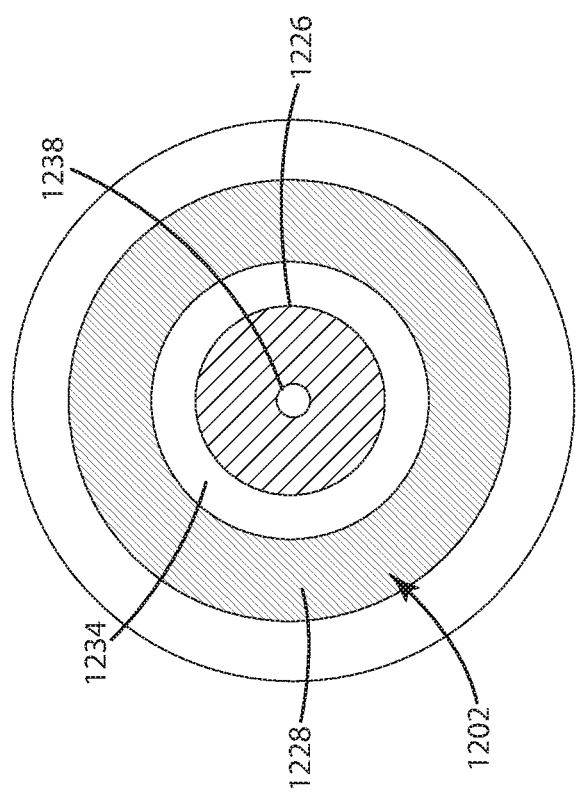
FIG. 17 is a schematic illustration of a heating element and RFID tag for the induction-heated vessel of FIG. 16.

Referring to FIG. 17, the RFID tag 1226 can comprise an RFID tag with a temperature sensor 1238 for temperature feedback. The RFID tag 1226 is adhered to the ceramic vessel in the area of the thermal void 1230 to allow the temperature of the contents of the vessel 1200 to be more directly measured by the temperature sensor 1238, which is aligned with the thin layer 1232 and within the heating coil 1228, without having to add the temperature sensor 1238 to the inside of the vessel 1200. Optionally, the RFID tag 1226 can comprise several temperature sensors 1238 that are used to determine both the temperature of the contents of the vessel 1200 and the temperature of the heating coil 1228. The RFID tag may be a single antenna or a dual antenna tag, enabling communication to both short distance and long distance readers.

In FIG. 17, one example of a spatial arrangement for the outer wall of the vessel 1200, the heating coil 1228, the RFID tag 1226, and the temperature sensor 1238 is shown. These components may be concentric as shown, made in an array, located separately from one another in space, or may be located in different areas of the vessel 1200 such as the sidewall 1210.

In one embodiment of a process for manufacturing the vessel 1200 shown in FIGS. 16-17, the container body or outer layer 1206 is formed with the thermal void 1230, and with the heating coil 1228 embedded therein. A glaze composition is applied to the ceramic outer layer 1206, such as by spray coating at least an inner surface of the outer layer 1206, and fired in a kiln using a single-fire cycle to form the glaze 1204. After firing, the RFID tag 1226 can be adhered to the base 1208 in the area of the thermal void 1230, with the temperature sensor 1238 aligned with the thin layer 1232 of the base 1208.

By separating the heating coil 1228 and thermal void 1230 in space, heat moves from the heating coil 1228, through the ceramic material of the inner surface 1216, and into the contents of the vessel 1200, then conducts back through the ceramic material of the outer layer 1206 in the area of the thermal void 1230 to the temperature sensor 1238. In other embodiments, the thermal void 1230 and heating coil 1228 can be located closer to one another, however in this case the temperature sensor 1238 may read the temperature of the heating coil 1228 instead of the contents of the vessel 1200.

Optionally, any embodiment of the vessels, systems, or methods disclosed herein can be usable with an induction heating device or appliance comprising a cooktop, stove, range, hob, or other appliance having an inducting heating or cooking surface, or an item of furniture incorporating an inducting heating or cooking surface. Additional examples of suitable induction heating devices or appliances are disclosed in International Publication Nos. WO2018/183574 and WO2018/183583, both published Oct. 4, 2018 and both of which are incorporated herein by reference in their entirety.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A heated ceramic vessel comprising:
    a ceramic container body for insulating the contents of the vessel, wherein the ceramic container body comprises a base and a sidewall, and defines a chamber in which the contents of the vessel are stored, and wherein the base and sidewall define an outer layer of the vessel;
    a conductive heating element for thermal transfer or conduction of heat to the contents of the vessel; and
    a radio-frequency identification (RFID) tag for identification and tracking of the vessel;
    wherein the conductive heating element comprises at least one of:
        a conductive glaze or coating on an inner surface of the ceramic container body; and
        a conductive inner layer on a base of the ceramic container body; or
        a label comprising a conductive element and the RFID tag;
    wherein the conductive glaze or coating comprises one of:
        a ceramic glaze with a semiconductor system, wherein the semiconductor system comprises copper and at least one of tin and tin oxide doped with antimony;
        a silica-carbon black coating; or
        a silica-ferrite coating.

2. The heated ceramic vessel of claim 1, wherein the RFID tag comprises a dual frequency tag used for identifying a product and communicating temperature control limits of the vessel.

3. The heated ceramic vessel of claim 1, wherein the RFID tag comprises:
    a smart tag comprising:
    an ultra-high frequency (UHF) antenna and UHF interface to implement a supply chain protocol for long range application purposes; and
    a high frequency (HF) antenna and high frequency interface to implement a proximity communication protocol to exchange data in a proximity range;
    at least one light-emitting diode (LED) integrated directly on the smart tag or implemented separately and electrically coupled to the smart tag; and
    a sensor system integrated directly on the smart tag or implemented separately and electrically coupled to the smart tag.

4. The heated ceramic vessel of claim 1, wherein the conductive heating element comprises the conductive glaze or coating on an inner surface of the ceramic container body, and wherein the conductive glaze or coating can be applied to >50%, >60%, >70%, >80%, >90%, or >99% of the inner surface of the ceramic container body.

* * * * *